United States Patent
Ge et al.

(10) Patent No.: US 10,057,012 B2
(45) Date of Patent: Aug. 21, 2018

(54) ERROR CORRECTION CIRCUIT AND OPTICAL TRANSMISSION SYSTEM

(71) Applicant: FUJITSU LIMITED, Kawasaki-shi, Kanagawa (JP)

(72) Inventors: Yi Ge, Bunkyo (JP); Hisao Nakashima, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/420,807

(22) Filed: Jan. 31, 2017

(65) Prior Publication Data
US 2017/0250780 A1    Aug. 31, 2017

(30) Foreign Application Priority Data
Feb. 25, 2016  (JP) .................................. 2016-034619

(51) Int. Cl.
| | | |
|---|---|---|
| H04B 10/2507 | (2013.01) | |
| H04L 1/00 | (2006.01) | |
| H04L 5/00 | (2006.01) | |
| H04B 10/079 | (2013.01) | |
| H04L 27/26 | (2006.01) | |
| H04L 27/34 | (2006.01) | |
| H04L 27/36 | (2006.01) | |

(52) U.S. Cl.
CPC ....... *H04L 1/007* (2013.01); *H04B 10/07953* (2013.01); *H04L 1/0042* (2013.01); *H04L 5/006* (2013.01); *H04L 27/2697* (2013.01); *H04L 27/3405* (2013.01); *H04L 27/362* (2013.01); *H04B 10/2507* (2013.01); *H04L 5/0005* (2013.01); *H04L 27/367* (2013.01)

(58) Field of Classification Search
CPC combination set(s) only.
See application file for complete search history.

(56) References Cited

U.S. PATENT DOCUMENTS 6,587,986 B1    7/2003  Kanazawa et al.
9,071,364 B1 *  6/2015  Voois .................. H04B 10/58
(Continued)

FOREIGN PATENT DOCUMENTS

| JP | 2000-196467 | 7/2000 |
|---|---|---|
| JP | 2010-041108 | 2/2010 |
| JP | 2011-250291 | 12/2011 |

*Primary Examiner* — David Payne
*Assistant Examiner* — Omar S Ismail
(74) *Attorney, Agent, or Firm* — Fujitsu Patent Center

(57) ABSTRACT

An error correction circuit includes a first error correction circuit, a second error correction circuit and a controller. The first error correction circuit performs an error correction in a first correction scheme. The second error correction circuit performs an error correction in a second correction scheme. A correction performance of the second correction scheme is lower than a correction performance of the first correction scheme. The controller makes the first error correction circuit perform error correction of a received signal when a capacity of the received signal is smaller than or equal to a processing capacity of the first error correction circuit, and makes the first error correction circuit and the second error correction circuit perform error correction of the received signal when the capacity of the received signal is larger than the processing capacity of the first error correction circuit.

10 Claims, 27 Drawing Sheets

(56) References Cited

U.S. PATENT DOCUMENTS

| | | | |
|---|---|---|---|
| 2007/0258366 A1* | 11/2007 | Imamura | H04L 5/0046 |
| | | | 370/230 |
| 2010/0027988 A1 | 2/2010 | Hoshida et al. | |
| 2010/0302458 A1* | 12/2010 | Kim | H03M 13/256 |
| | | | 348/726 |
| 2011/0293266 A1* | 12/2011 | Aoki | H04B 10/516 |
| | | | 398/25 |
| 2015/0341054 A1* | 11/2015 | Myung | H03M 13/1102 |
| | | | 714/776 |
| 2016/0373138 A1* | 12/2016 | Li | H03M 13/353 |

\* cited by examiner

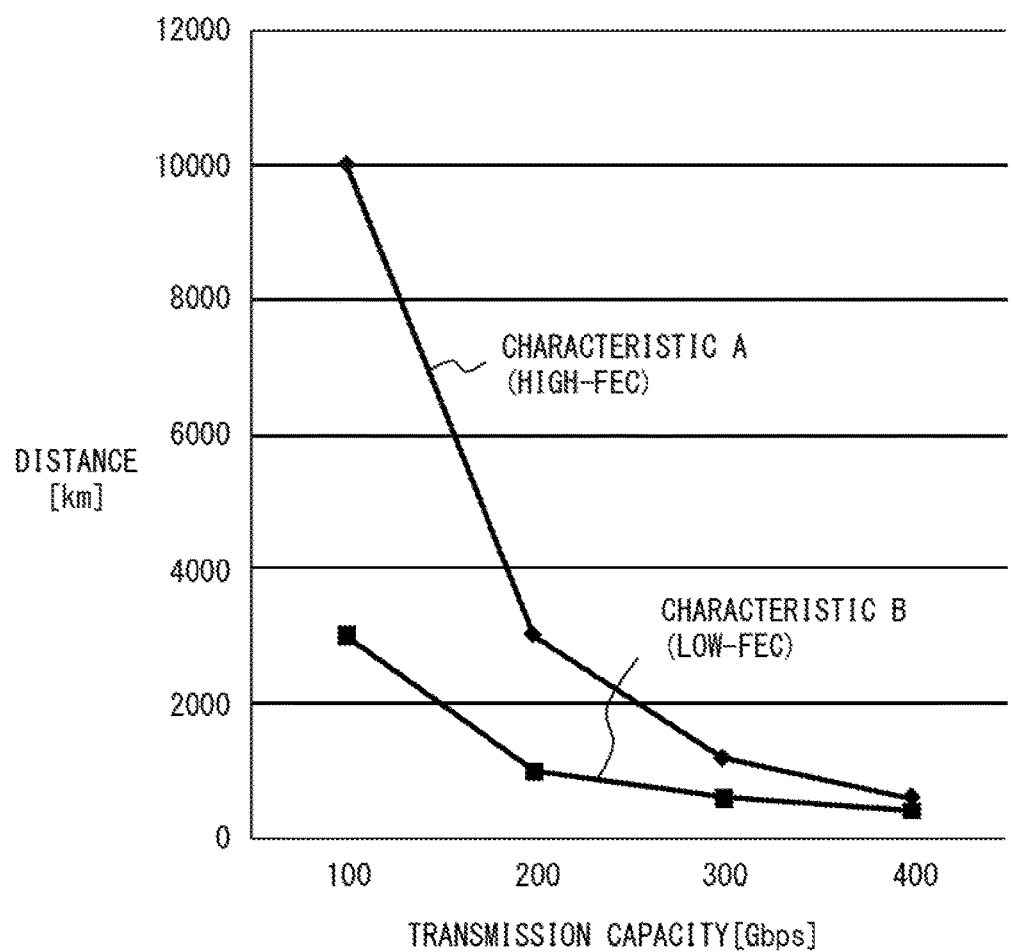
F I G. 8

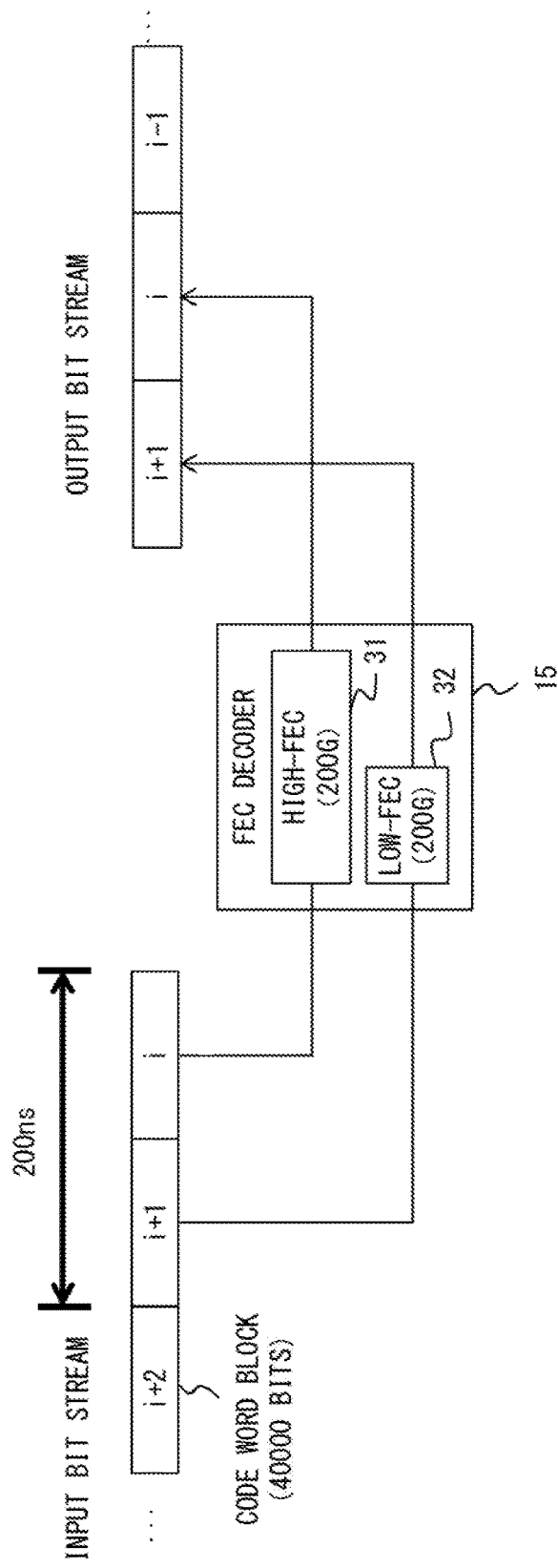
F I G. 11

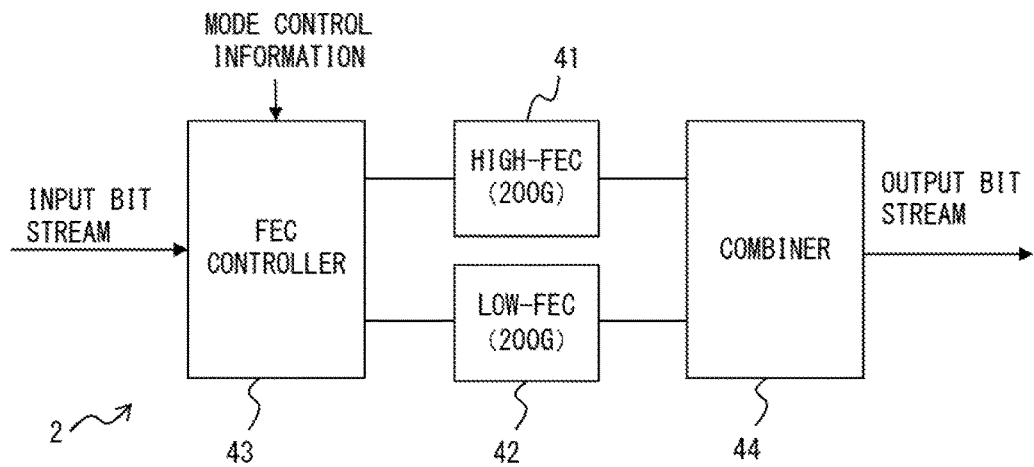
F I G. 1 2 A
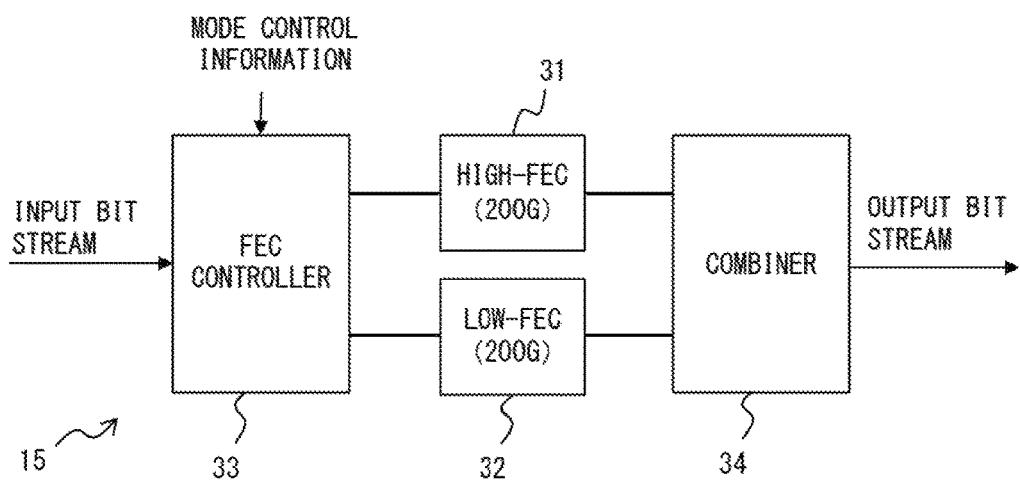
F I G. 1 2 B

|  | CONFIG_1 (FIG. 4) | CONFIG_2 (FIG. 5) | EMBODIMENT (FIG. 9) |
| --- | --- | --- | --- |
| LOW-FEC | 0 | 4 | 2 |
| HIGH-FEC | 12 | 6 | 6 |
| TOTAL | 12 | 10 | 8 |

|  | CONFIG_1 (FIG. 4) | CONFIG_2 (FIG. 5) | EMBODIMENT (FIG. 9) |
| --- | --- | --- | --- |
| AREA RATIO | 100% | 83% | 67% |
| AREA RATIO | 120% | 100% | 80% |

F I G. 1 3

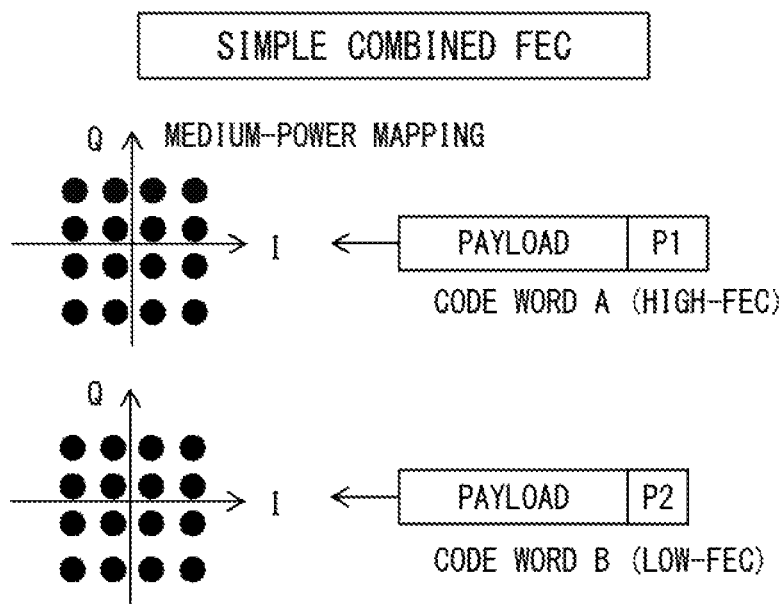
F I G. 1 8 A
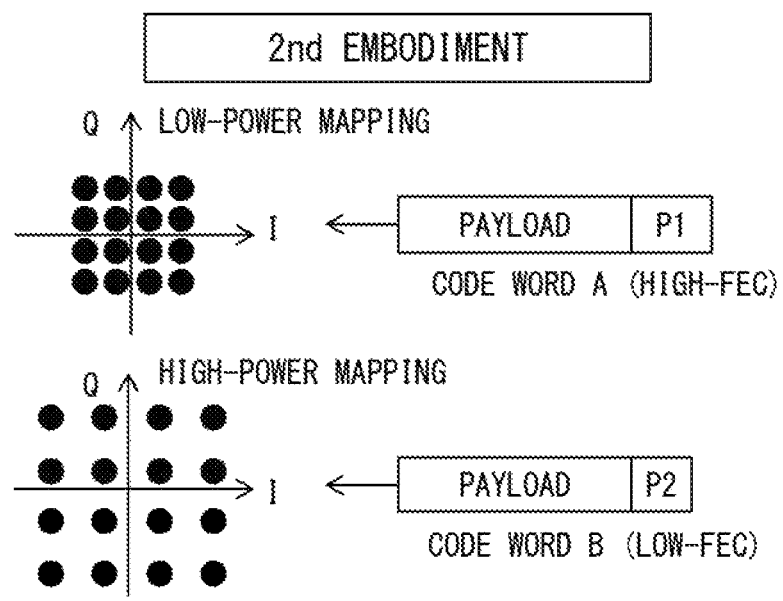
F I G. 1 8 B

<LOW POWER MAPPING>

| INPUT BIT | I | Q |
|---|---|---|
| 0000 | 12 | 12 |
| 0001 | 4 | 12 |
| 0010 | 12 | 4 |
| ⋮ | | |
| 1111 | −4 | −4 |

~ 63

F I G.  2 0 A

<MIDIUM POWER MAPPING>

| INPUT BIT | I | Q |
|---|---|---|
| 0000 | 15 | 15 |
| 0001 | 5 | 15 |
| 0010 | 15 | 5 |
| ⋮ | | |
| 1111 | −5 | −5 |

~ 64

F I G.  2 0 B

<HIGH POWER MAPPING>

| INPUT BIT | I | Q |
|---|---|---|
| 0000 | 18 | 18 |
| 0001 | 6 | 18 |
| 0010 | 18 | 6 |
| ⋮ | | |
| 1111 | −6 | −6 |

~ 65

F I G.  2 0 C

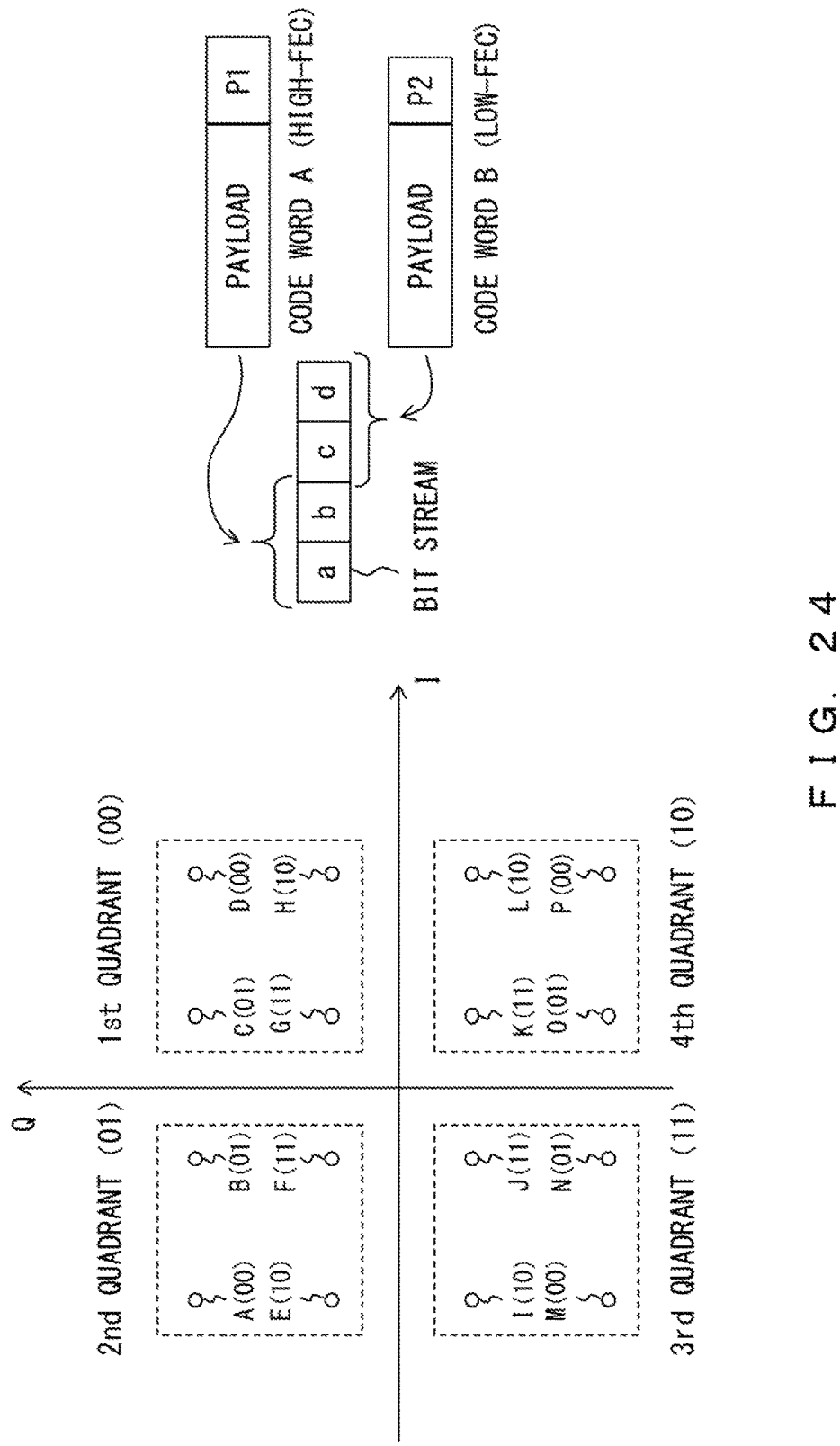
F I G. 24

|  | CONFIG_1 | CONFIG_2 | SIMPLE COMBINED FEC | 1st EMBODIMENT | 2nd EMBODIMENT | 3rd EMBODIMENT | 4th EMBODIMENT |
|---|---|---|---|---|---|---|---|
| FEC AREA | 100% | 83% | | | 67% | | |
| SYMBOL RATE | 62.75Gbaud | 60.25Gbaud | 61.5Gbaud | 60.25Gbaud | 61.5Gbaud | 60.25Gbaud | 61.5Gbaud (60.25Gbaud, 62.75Gbaud) |
| SIGNAL QUALITY | 0.5dB | 0dB (REFERENCE) | -0.1dB | 0dB | 0.15dB | 0dB | 0dB |

F I G. 2 6

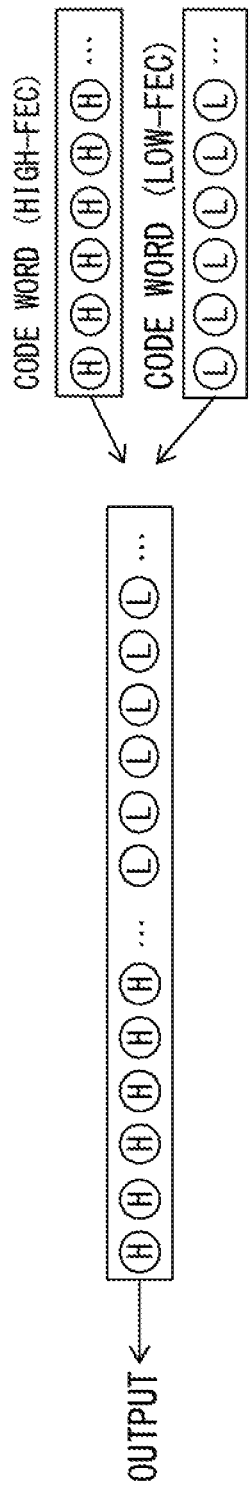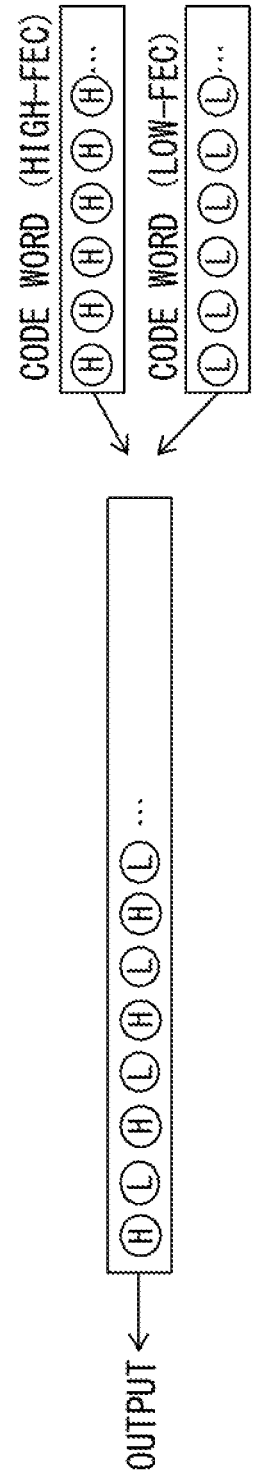

US 10,057,012 B2

ERROR CORRECTION CIRCUIT AND OPTICAL TRANSMISSION SYSTEM

CROSS-REFERENCE TO RELATED APPLICATION

This application is based upon and claims the benefit of priority of the prior Japanese Patent Application No. 2016-034619, filed on Feb. 25, 2016, the entire contents of which are incorporated herein by reference.

FIELD

The embodiments discussed herein are related to an error correction circuit and an optical transmission system.

BACKGROUND

Large-capacity optical transmission systems have been put into practical use. Currently, a configuration in which data of about 100 Gbps are transmitted between nodes has been put into practical use. Furthermore, studies of a configuration in which data of 200 Gbps or 400 Gbps are transmitted between nodes have been carried out. An optical transmission system requires a very small bit error rate, and therefore, many optical transmission systems are equipped with a function for performing error correction using Forward Error Correction (FEC).

The error correction function is realized with a digital signal processor circuit. Here, the size of the forward error correction circuit (hereinafter, referred to as the FEC circuit) depends on the transmission capacity and the correction performance. For example, in order to perform error correction of a large-capacity signal, a large-scale FEC circuit is required. In addition, a large-scale FEC circuit is also required when performing a high-performance error correction.

In the existing optical transmission systems, multiple modulation schemes do not coexist, and in many cases, QPSK (Quadrature Phase Shift Keying) modulated optical signals are transmitted between nodes. However, along with increases in the capacity of optical transmission systems, studies have been carried out for introducing a modulation scheme in which the number of bits per symbol is large. For example, studies of a system in which 16QAM (Quadrature Amplitude Modulation) modulated optical signals or 64QAM modulated optical signals are transmitted between nodes have been carried out. Furthermore, there has been a demand for a configuration in which optical paths may be flexibly switched within an optical transmission system. Therefore, it is preferable that the FEC circuit also be capable of handling various transmission capacities and various transmission distances according to the communication application.

Note that error correction is described in Japanese Laid-open Patent Publication No. 2000-196467 or Japanese Laid-open Patent Publication No. 2010-41108, for example. In addition, a method for generating a modulated signal according to a communication scheme selected from a plurality of communication schemes is described in Japanese Laid-open Patent Publication No. 2011-250291, for example.

In order to handle various transmission capacities, the FEC circuit needs to be capable of processing the signal of the maximum possible transmission capacity. For example, in a case in which signals of 100 Gbps, 200 Gbps, and 400 Gbps may be transmitted, an FEC circuit that is capable of processing a 400 Gbps signal is required. In this case, the size of the FEC circuit becomes large. In addition, in order to cope with both a small-distance transmission system and a large-distance transmission system, the FEC circuit needs to be capable of processing a signal of the possible maximum transmission distance. In this case, since a high error-correction performance is required, the size of the FEC circuit becomes large.

However, when the error correction function is realized with a digital signal processor circuit, the FEC circuit occupies a very large proportion of the area in the digital signal processor circuit. That is, there is a limit to increasing the size of the FEC circuit. For this reason, it is preferable to suppress increases in the size of the FEC circuit, even when the transmission capacity becomes large.

SUMMARY

According to an aspect of the present invention, an error correction circuit processes a signal to which an error correction code is added. The error correction circuit includes: a first error correction circuit configured to perform an error correction in a first correction scheme; a second error correction circuit configured to perform an error correction in a second correction scheme, a correction performance of the second correction scheme being lower than a correction performance of the first correction scheme; and a controller configured to make the first error correction circuit perform error correction of a received signal when a capacity of the received signal is smaller than or equal to a processing capacity of the first error correction circuit, and make the first error correction circuit and the second error correction circuit perform error correction of the received signal when the capacity of the received signal is larger than the processing capacity of the first error correction circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of characteristics of the high-performance FEC and the low-performance FEC.

FIG. 11 illustrates an example of the operation of an FEC decoder in a case in which the transmission capacity is large;

FIGS. 12A and 12B illustrate an example of the configuration of an FEC encoder and an FEC decoder;

FIG. 13 presents a comparison of the circuit area of an FEC decoder;

FIGS. 18A and 18B are diagrams illustrating an example of the operation in the second embodiment;

FIGS. 20A-20C are diagrams illustrating examples of mapping tables;

FIG. 24 illustrates an example of the operation in the fifth embodiment;

FIG. 26 presents a comparison of the area and signal quality of an FEC decoder; and FIGS. 27A and 27B illustrate an example of the operation in other embodiments.

DESCRIPTION OF EMBODIMENTS

Figure 1:
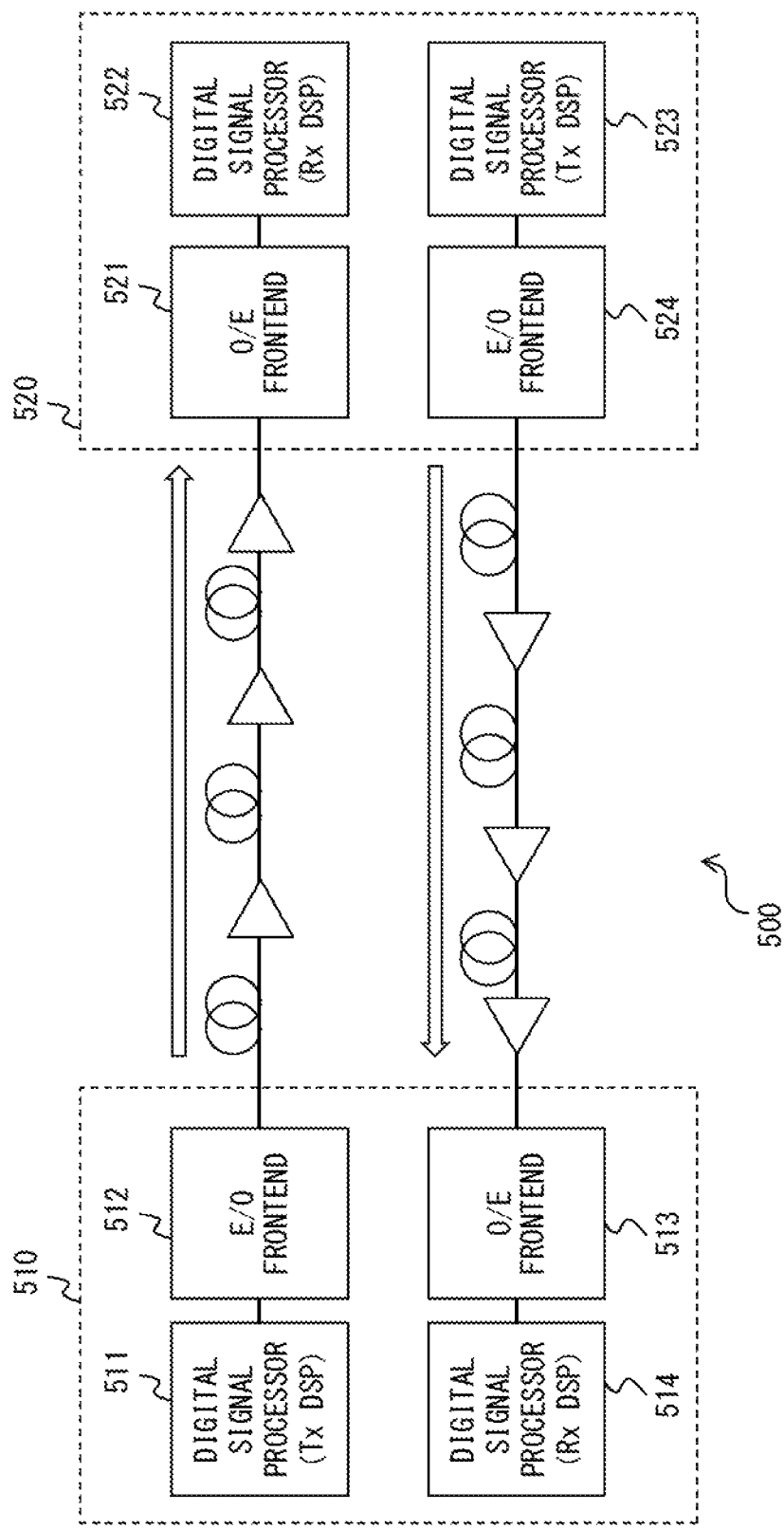
FIG. 1 illustrates an example of an optical transmission system.

FIG. 1 illustrates an example of an optical transmission system. An optical transmission system 500 includes a communication device 510 and a communication device 520. The communication device 510 and the communication device 520 are connected by an optical transmission link. The optical transmission link is realized with an optical fiber link. One or a plurality of optical amplifier nodes may be provided on the optical transmission link.

The communication device 510 is equipped with a digital signal processor (Tx_DSP) 511, an E/O front-end circuit 512, an O/E front-end circuit 513, and a digital signal processor (Rx_DSP) 514. The digital signal processor 511 generates a symbol stream from input data. The E/O front-end circuit 512 generates a modulated optical signal from the symbol stream generated by the digital signal processor 511. The modulated optical signal is transmitted to the communication device 520 via the optical transmission link.

The communication device 520 is equipped with an O/E front-end circuit 521, a digital signal processor (Rx_DSP) 522, a digital signal processor (Tx_DSP) 523, and an E/O front-end circuit 524. The O/E front-end circuit 521 converts the modulated optical signal received from the communication device 510 into an electrical signal. The digital signal processor 522 recovers data from the electrical signal output from the O/E front-end circuit 521.

The optical transmission system 500 corrects the error in a signal using an error correction code. Therefore, the digital signal processor 511 includes an FEC encoder that adds an error correction code to a transmission signal. Meanwhile, the digital signal processor 522 includes an FEC decoder that corrects the error in a received signal using an error correction code.

Note that the functions of the O/E front-end circuit 513 and the digital signal processor 514 are substantially the same as those of the O/E front-end circuit 521 and the digital signal processor 522, and therefore, explanation is omitted. In a similar manner, the functions of the digital signal processor 523 and the E/O front-end circuit 524 are substantially the same as those of the digital signal processor 511 and the E/O front-end circuit 512, and therefore, explanation is omitted.

Figure 2:
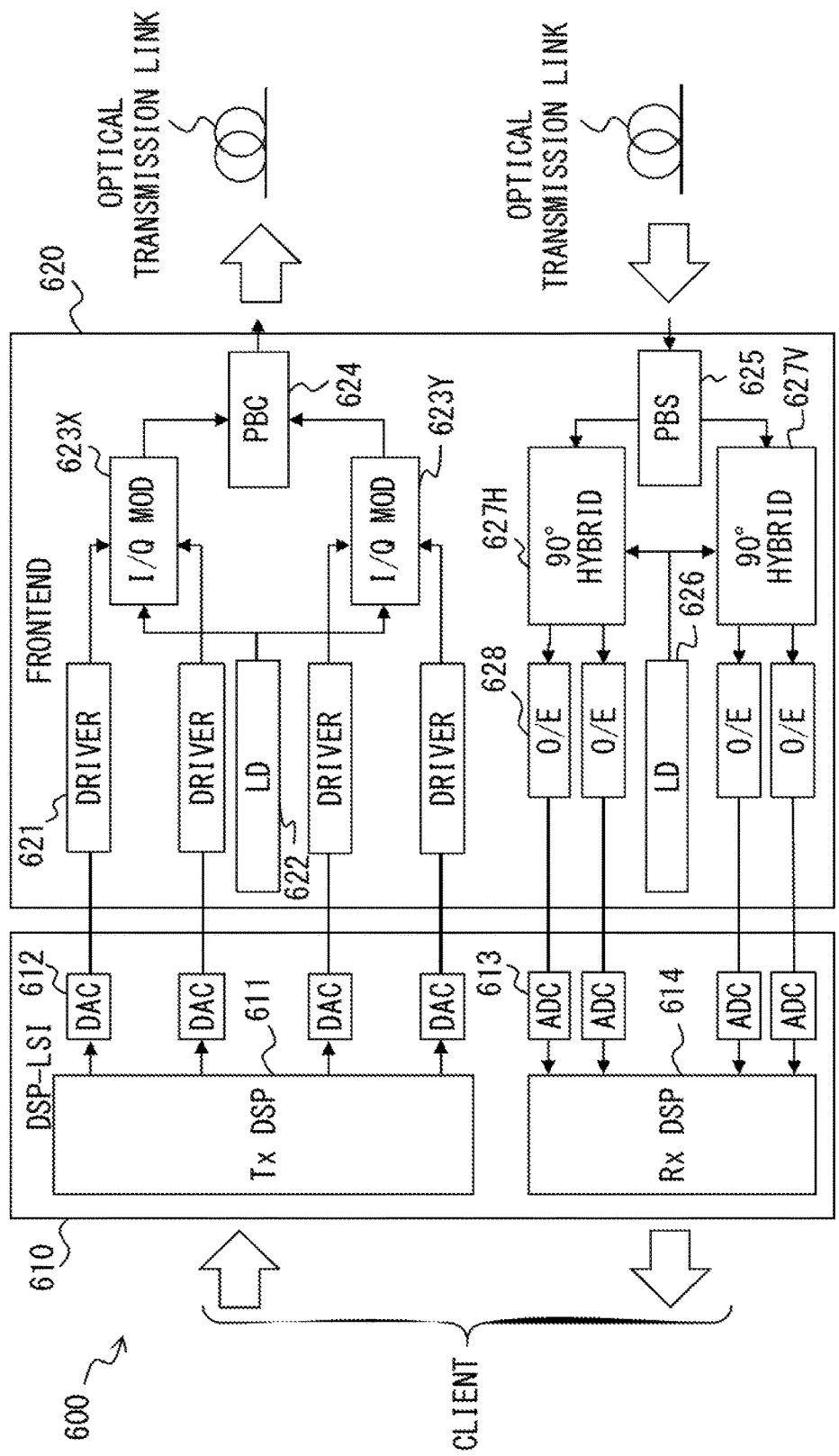
FIG. 2 illustrates an example of a communication device.

FIG. 2 illustrates an example of a communication device used in an optical transmission system. In the optical transmission system 500 illustrated in FIG. 1, a communication device 600 illustrated in FIG. 2 may be used as the communication device 510 or the communication device 520. The communication device 600 is equipped with a signal processor (DSP_LSI) 610 and a front-end circuit 620.

The signal processor 610 is equipped with a transmission signal processor (Tx_DSP) 611, a D/A converter (DAC) 612, an A/D converter (ADC) 613, and a received signal processor (Rx_DSP) 614. The transmission signal processor 611 generates a symbol stream from input data. In this example, the communication device 600 transmits polarization-multiplexed modulated optical signals. Therefore, the transmission signal processor 611 generates a symbol stream X and a symbol stream Y from input data. Each of the symbol streams is indicated by an I-component signal and a Q-component signal. That is, the transmission signal processor 611 generates signals XI and XQ that indicate the symbol stream X, and signals YI and YQ that indicate the symbol stream Y. The D/A converter 612 converts an output signal of the transmission signal processor 611 into an analog signal.

The front-end circuit 620 includes an E/O front-end unit and an O/E front-end unit. The E/O front-end unit is equipped with a driver 621, a laser light source (LD) 622, I/Q optical modulators 623X, 623Y, and a polarization beam combiner (PBC) 624, for generating a modulated optical signal from symbol streams. The driver 621 generates drive signals XI, XQ, YI, YQ from analog signals output from the signal processor 610. The laser light source 622 generates continuous wave light of a specified wavelength. The I/Q optical modulator 623X modulates the continuous wave light with the drive signals XI, XQ to generate a modulated optical signal X. The I/Q optical modulator 623Y modulates the continuous wave light with the drive signals YI, YQ to generate a modulated optical signal Y. The polarization beam combiner 624 combines the modulated optical signal X and the modulated optical signal Y to generate a polarization-multiplexed modulated optical signal.

The O/E front-end unit generates an electrical signal that indicates the electrical field information of a received optical signal by coherent detection. Therefore, the O/E front-end unit is equipped with a polarization beam splitter (PBS) 625, a laser light source (LD) 626, optical 90-degree hybrid circuits 627H, 627V, and an O/E converter 628. The polarization beam splitter 625 splits a received optical signal into an optical signal H and an optical signal V. The polarizations of the optical signal H and the optical signal V are orthogonal to each other. The laser light source 626 generates local light. The wavelength of the local light is approximately the same as the wavelength of the carrier of the received optical signal. The optical 90-degree hybrid circuit 627H generates optical components HI and HQ from the optical signal H using the local light. The optical 90-degree hybrid circuit 627V generates optical signals VI and VQ from the optical signal V using the local light. The O/E converter 628 converts each of the optical components HI, HQ, VI, VQ into an electrical signal.

The A/D converter 613 converts each of the electrical signals HI, HQ, VI, VQ generated in the front-end circuit 620 into a digital signal. The received signal processor 614 recovers data from the digital signals HI, HQ, VI, VQ.

Figure 3:
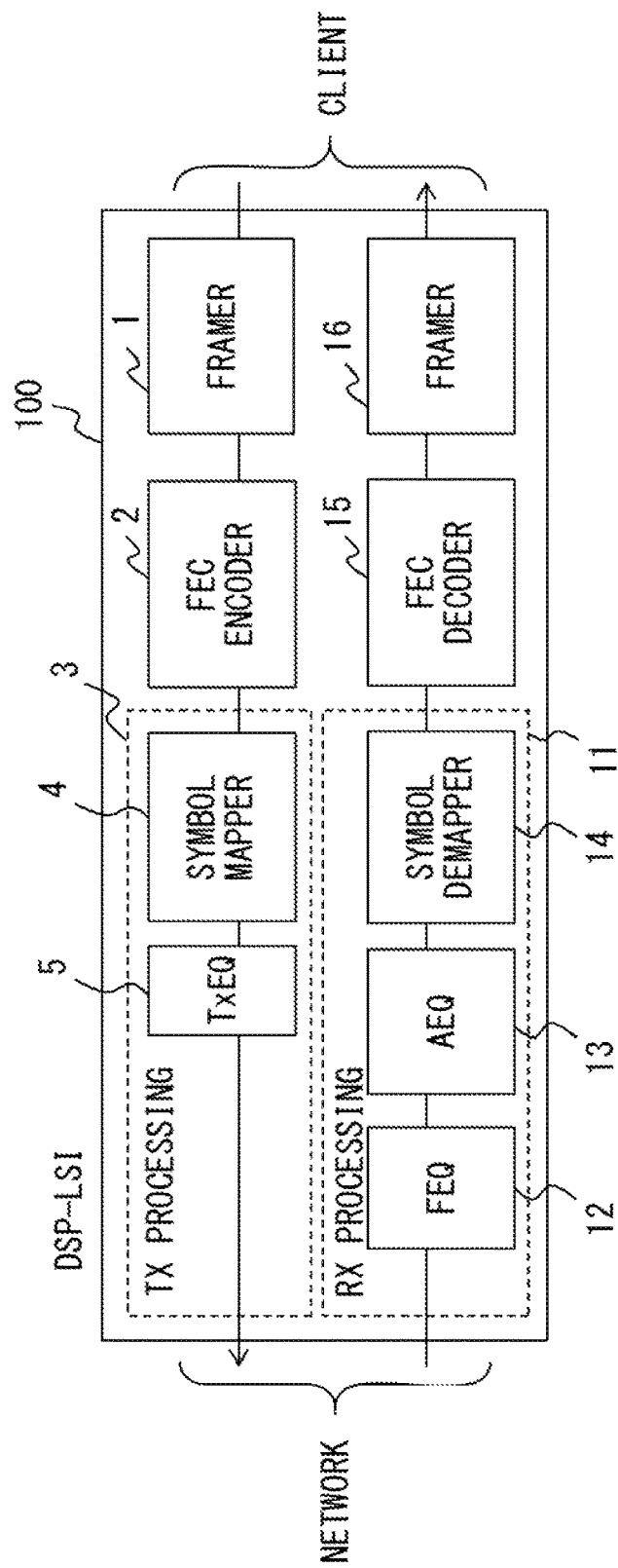
FIG. 3 is a block diagram illustrating an example of the function of a signal processor.

FIG. 3 is a block diagram illustrating the function of a signal processor (DSP_LSI). A signal processor 100 is equipped with a framer 1, an FEC encoder 2, a transmission signal processing unit (transmission signal processor) 3, a received signal processing unit (received signal processor) 11, an FEC decoder 15, and a framer 16. The transmission signal processing unit 3 includes a symbol mapper 4 and the pre-equalizer (TxEQ) 5. In addition, the received signal processing unit 11 includes a fixed equalizer (FEQ) 12, an adaptive equalizer (AEQ) 13, and a symbol demapper 14. Meanwhile, the signal processor 100 illustrated in FIG. 3 corresponds to the signal processor 610 illustrated in FIG. 2. However, in FIG. 3, the D/A converter 612 and A/D converter 613, and the like are omitted.

The framer 1 generates a frame of a specified length from input data. The FEC encoder 2 generates a code word by adding an error correction code to each frame. Meanwhile, in the description below, the error correction code may be referred to as a "parity bit" or simply "parity". The symbol mapper 4 performs mapping of an output signal (that is, a bit stream to which the error correction code is added) of the FEC encoder 2, according to a specified modulation scheme. For example, when the modulation scheme is 16QAM, the symbol mapper 4 generates one symbol from data of 4 bits. At this time, the generated symbol indicates the phase and amplitude corresponding to the value of the data of 4 bits. The pre-equalizer 5 performs pre-equalization for the output signal of the symbol mapper 4 according to the characteristic of the optical transmission link.

The fixed equalizer 12 and the adaptive equalizer 13 equalize a received signal so as to compensate for a dispersion or the like generated in an optical transmission link. The symbol demapper 14 recovers the bit stream from the equalized signal, for each symbol, according to the modulation scheme. The FEC decoder 15 detects and corrects the error of the output signal of the symbol demapper 14, for each code word, using the error correction code. The framer 16 converts the frame transmitted in the network into a frame to be transmitted in the client line.

In the signal processor 100 illustrated in FIG. 3, the amount of operation of the FEC decoder 15 is larger compared with that of other circuit elements. For this season, in an LSI that includes the signal processor 100, the circuit area used for the FEC decoder 15 is large. In particular, when a high error correction performance is required or when the transmission capacity is large, the ratio of the area occupied by the FEC decoder 15 with respect to the entirety of the LSI becomes very high.

Figure 4:
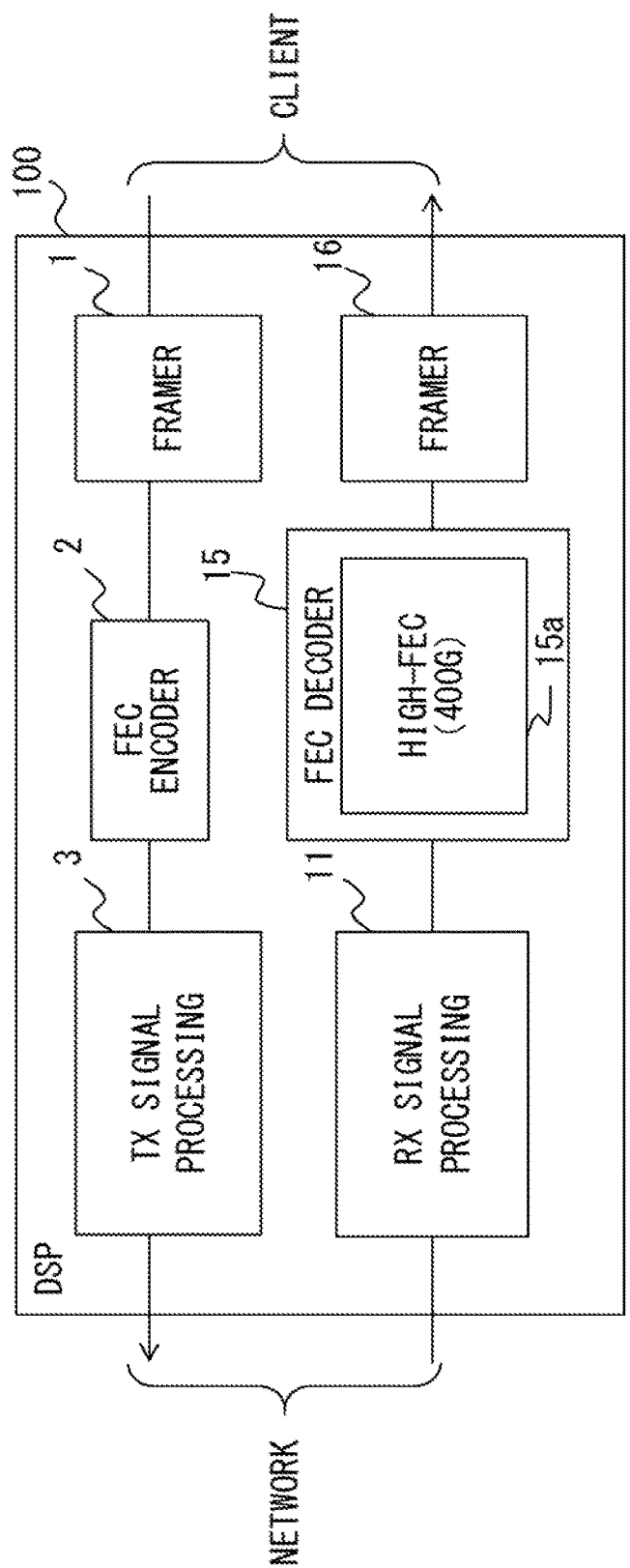
FIG. 4 illustrates the configuration (configuration example 1) of an FEC decoder.
Figure 5:
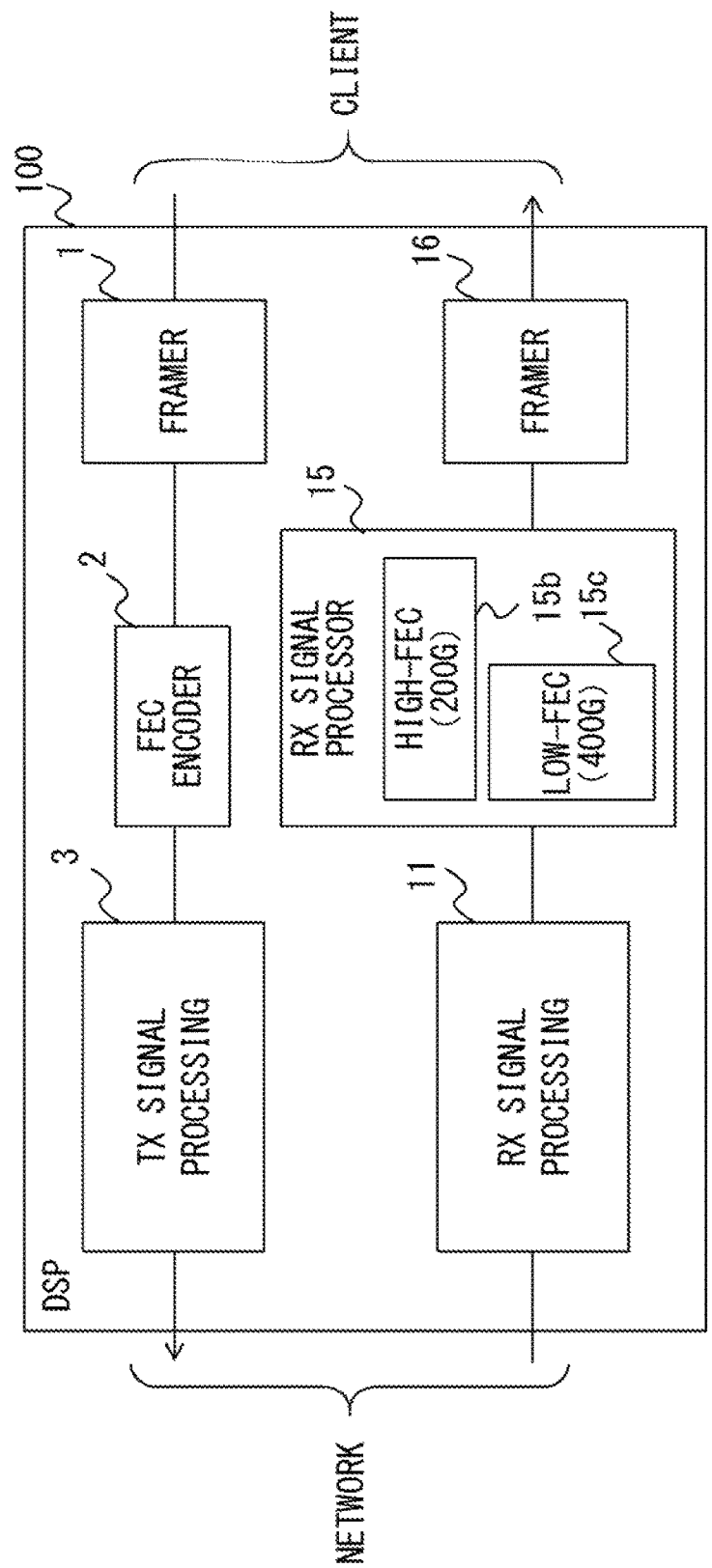
FIG. 5 illustrates the configuration (configuration example 2) of an FEC decoder.

FIGS. 4-5 illustrate configuration examples of the FEC decoder. In the description below, the maximum transmission capacity of the optical transmission system is assumed to be 400 Gbps. For example, it is assumed that signals of 200 Gbps and signals of 400 Gbps are transmitted in the optical transmission system. Therefore, the signal processor 100 needs to be capable of processing both signals of 200 Gbps and signals of 400 Gbps. Meanwhile, compared with the FEC decoder 15, the circuit scale of the FEC encoder 2 is small. Therefore, hereinafter, explanation of the FEC encoder 2 is omitted.

In the configuration example 1 illustrated in FIG. 4, the FEC decoder 15 is realized with a 400 G high-performance FEC encoder 15a. "400 G" represents the capability to process signals of 200 Gbps/400 Gbps. Therefore, the FEC decoder 15 of the configuration example 1 is capable of processing signals of a large capacity (that is, 400 Gbps). "High-performance" represents a high error correction performance. Therefore, the FEC decoder 15 of the configuration example 1 may be applied to an optical transmission system with a long transmission distance. However, in the configuration example 1, the circuit scale of the FEC decoder 15 becomes large.

In order to reduce the circuit scale of the FEC decoder of the configuration example 1 illustrated in FIG. 4, the FEC decoder 15 of the configuration example 2 illustrated in FIG. 5 is realized with a 200 G high-performance FEC encoder 15b and a 400 G low-performance FEC decoder 15c. "200 G" represents the capability to process signals of 200 Gbps and a lack of the capability to process signals of 400 Gbps. Meanwhile, "low-performance" represents a lower error correction performance than "high-performance". Then, in the configuration example 2, when the transmission capacity of a received signal is 200 Gbps, error correction is performed by the 200 G high-performance FEC encoder 15b. Therefore, when the transmission capacity of a received signal is 200 Gbps, the FEC decoder 15 of the configuration example 2 may be applied to an optical transmission system with a long transmission distance. Meanwhile, when the transmission capacity of a received signal is 400 Gbps, error correction is performed by the 400 G low-performance FEC decoder 15c. For this reason, when the transmission capacity of a received signal is 400 Gbps, it is difficult to apply the FEC decoder 15 of the configuration example 2 to a communication with a long transmission distance.

Figure 6:
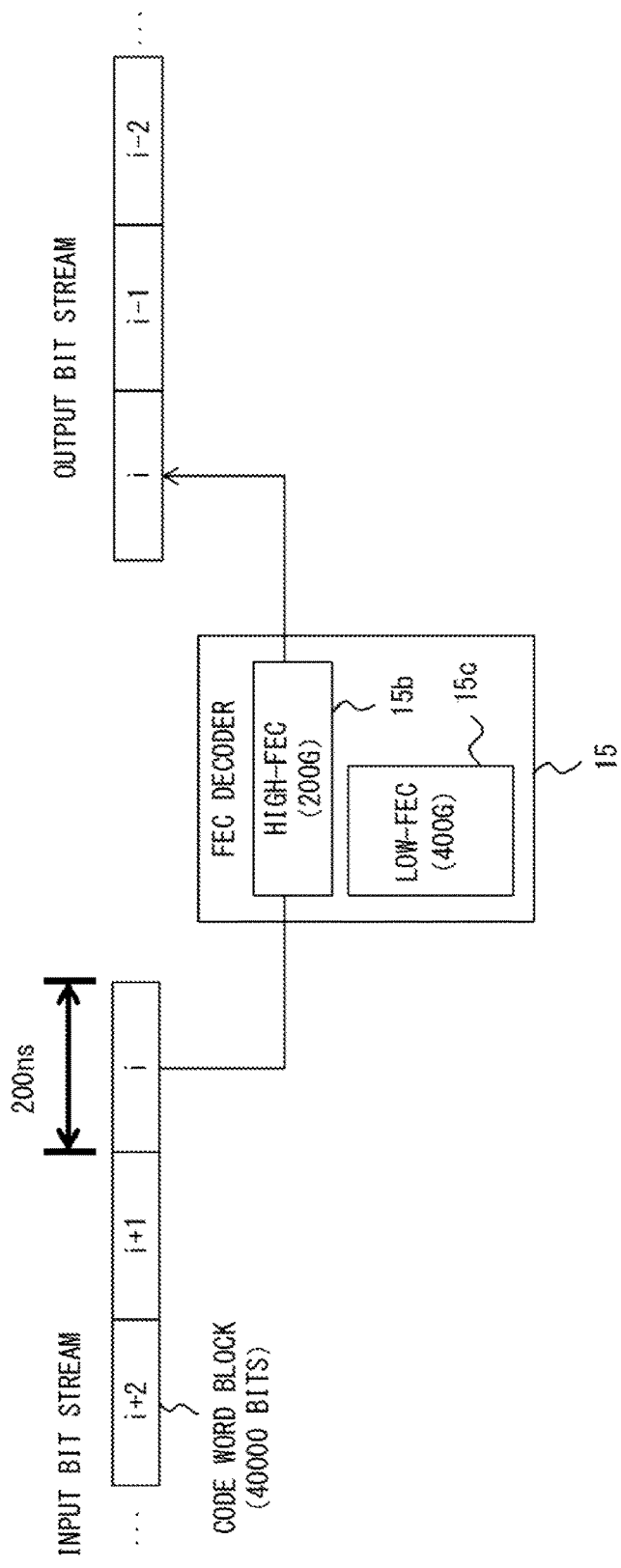
FIG. 6 illustrates an example of the operation in the configuration example 2 in a case in which the transmission capacity is small.
Figure 7:
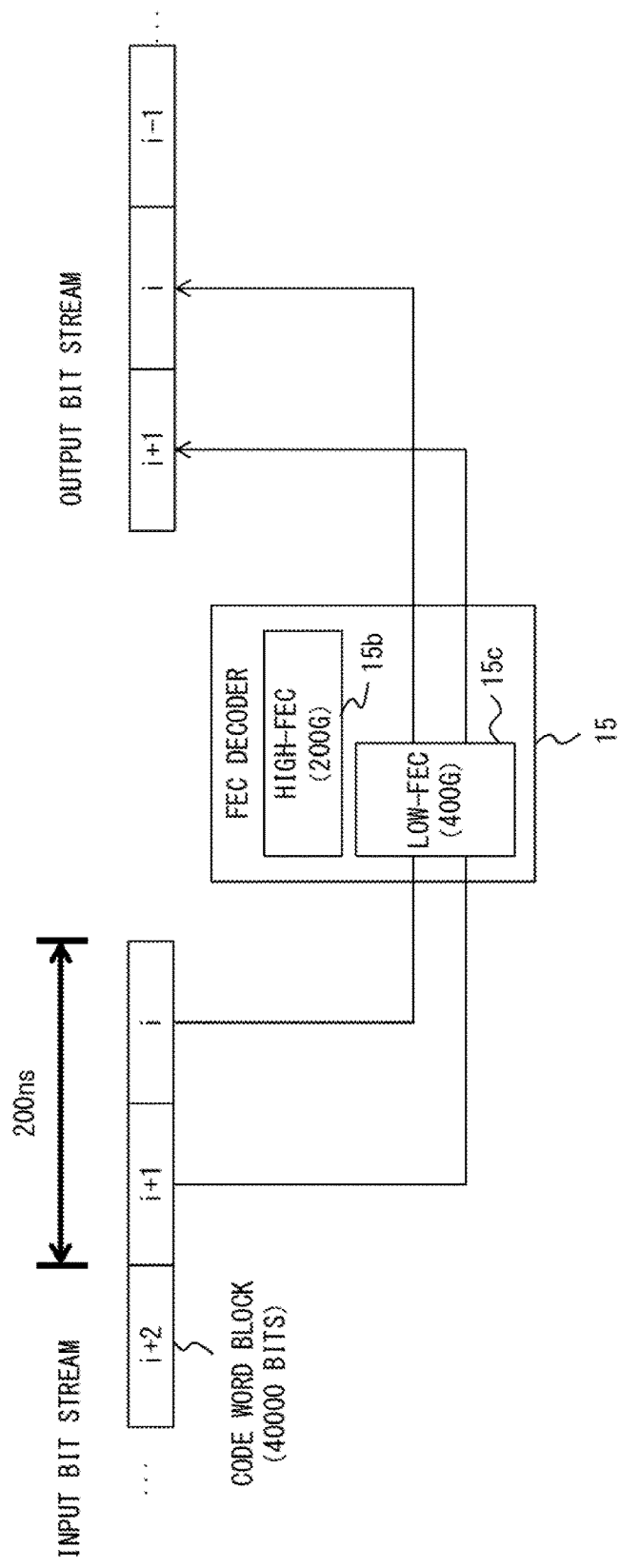
FIG. 7 illustrates an example of the operation in the configuration example 2 in a case in which the transmission capacity is large.

FIGS. 6-7 illustrate an example of the operation of the FEC decoder of the configuration example 2. Meanwhile, in the description related to FIGS. 6-7, in order to simplify the explanation, it is assumed that the FEC circuit operates under the following conditions.

The length of a code word block is 40000 bits. That is, the FEC circuit processes an input bit stream by dividing it into 40000 bits. The amount of data (throughput) processed by the FEC circuit changes according to the operation mode that specifies the transmission capacity. For example, in the 200 G mode for transmitting signals at 200 Gbps, the FEC circuit processes 40000 bits per unit time. That is, in the 200 G mode, the FEC circuit processes one code word block per unit time. Meanwhile, in the 400 G mode for transmitting signals at 400 Gbps, the FEC circuit processes 80000 bits per unit time. That is, in the 400 G mode, the FEC circuit processes two code word blocks per unit time. Note that the unit time is 200 n seconds in the examples.

When the signal processor 100 operates in the 200 G mode, as illustrated in FIG. 6, the input bit stream is processed by the 200 G low-performance FEC decoder 15b. In this case, the FEC decoder 15 processes one code word per unit time.

When the signal processor 100 operates in the 400 G mode, as illustrated in FIG. 7, the input bit stream is processed by the 400 G low-performance FEC decoder 15c. In this case, the FEC decoder 15 processes two code words per unit time.

FIG. 8 illustrates an example of characteristics of the high-performance FEC and the low-performance FEC. Characteristic A represents the maximum transmission distance in data transmission using the high-performance FEC. Characteristic B represents the maximum transmission distance in data transmission using the low-performance FEC. Meanwhile, the maximum transmission distance is plotted with respect to the transmission capacity.

When the FEC circuit is realized with the configuration example 1, the characteristic A is obtained with respect to the transmission capacity of 100 Gbps through 400 Gbps. That is, according to the configuration example 1, long-distance transmission is realized. When the FEC circuit is realized with the configuration example 2, the characteristic A is obtained with respect to the transmission capacity of 100 Gbps through 200 Gbps, but the characteristic B is obtained with respect to the transmission capacity of 200 Gbps through 400 Gbps. That is, according to the configuration example 2, the maximum transmission distance becomes short when the transmission capacity is large.

Embodiments

Figure 9:
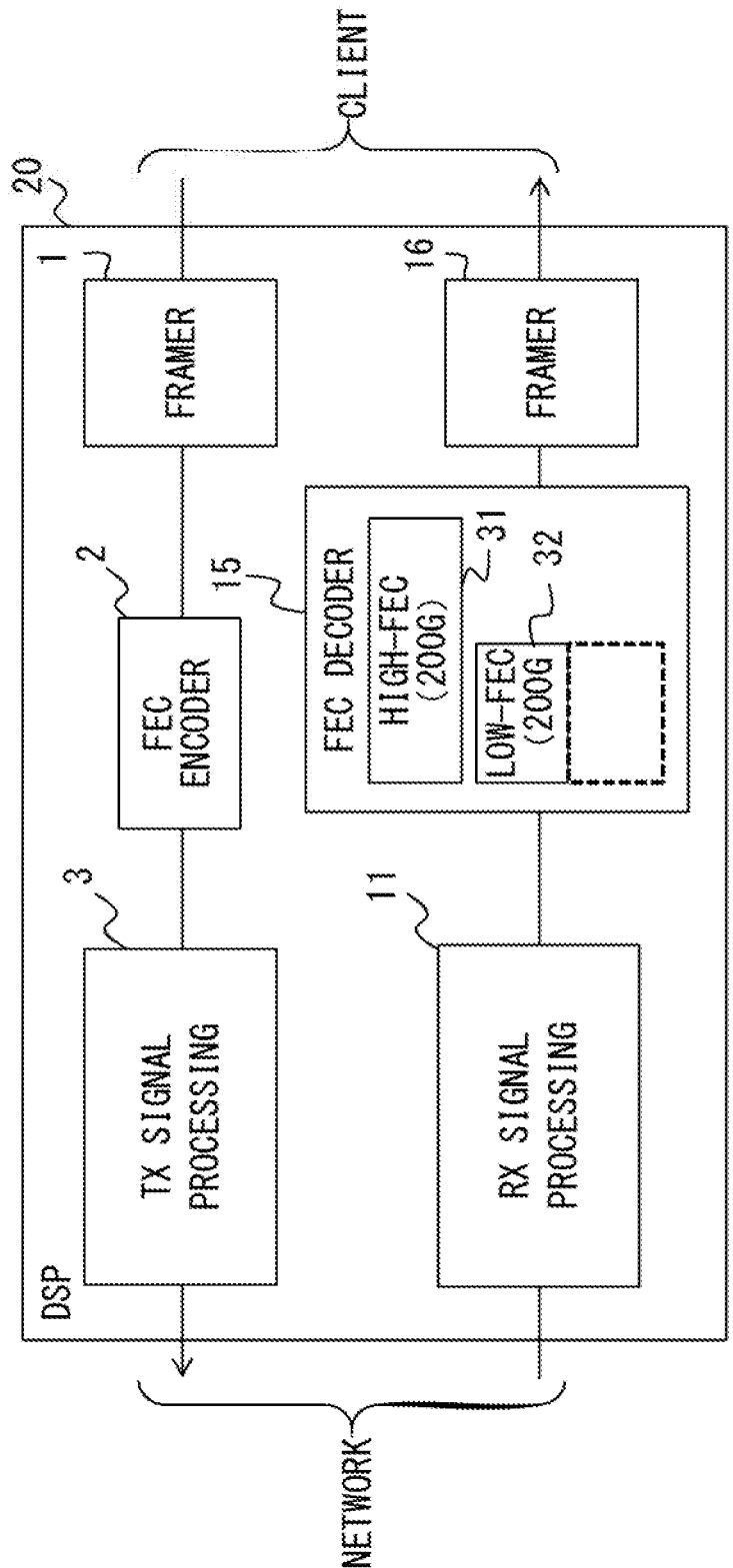
FIG. 9 illustrates an example of a signal processor according to the embodiments of the present invention.

FIG. 9 illustrates an example of a signal processor according to the embodiments of the present invention. The FEC decoder 15 provided in a signal processor 20 of the embodiments is realized with a 200 G high-performance FEC decoder 31 and a 200 G low-performance FEC decoder 32. The 200 G high-performance FEC decoder 31 is substantially the same as the 200 G high-performance FEC encoder 15b illustrated in FIG. 5. In addition, the error correction performance of the 200 G low-performance FEC decoder 32 is substantially the same as that of the 400 G low-performance FEC decoder 15c illustrated in FIG. 5. However, the circuit scale of the 200 G low-performance FEC decoder 32 is about half that of the 400 G low-performance FEC decoder 15c illustrated in FIG. 5. That is, compared with the configuration example illustrated in FIG. 5, in the signal processor 20 of the embodiments, the area occupied for FEC processing is reduced by the amount corresponding to the area enclosed by the broken line.

As described above, the FEC circuit according to the embodiments of the present invention is equipped with a plurality of FEC decoders having different error correction performances. Therefore, in the description below, the configuration of the FEC circuit according to the embodiments of the present invention may be referred to as a "combined FEC configuration". In addition, the FEC scheme according to the embodiments of the present invention may be referred to as a "combined FEC scheme".

Figure 10:
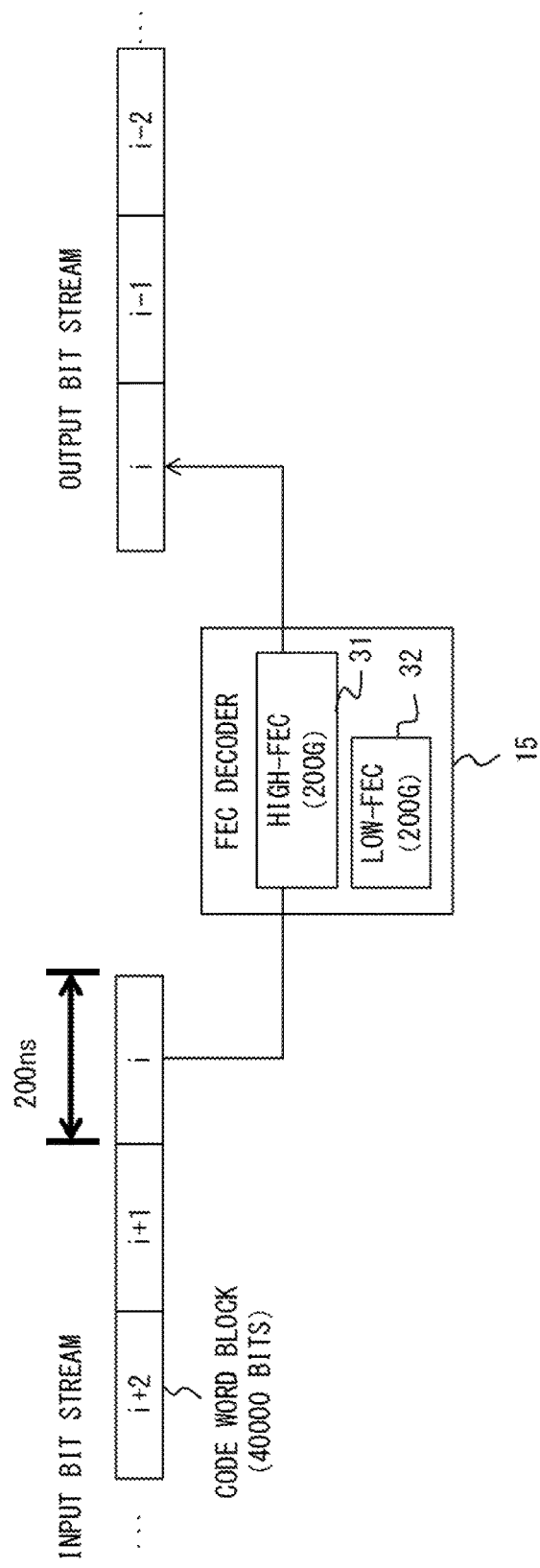
FIG. 10 illustrates an example of the operation of an FEC decoder in a case in which the transmission capacity is small.

FIGS. 10-11 illustrate an example of the operation of the FEC decoder of the embodiments. In a similar manner as the examples illustrated in FIGS. 6-7, in the description related to FIGS. 10-11, it is assumed that the FEC circuit operates under the following conditions. The length of a code word block is 40000 bits. That is, the FEC circuit processes an input bit stream by dividing it into 40000 bits. The amount of data (throughput) processed by the FEC circuit changes according to the operation mode that specifies the transmission capacity. For example, in the 200 G mode for transmitting signals at 200 Gbps, the FEC circuit processes one code word block per unit time. Meanwhile, in the 400 G mode for transmitting signals at 400 Gbps, the FEC circuit processes two code word blocks per unit time. In this case, the unit time is 200 n seconds.

When the signal processor 20 operates in the 200 G mode, as illustrated in FIG. 10, the input bit stream is processed by the 200 G high-performance FEC decoder 31. In this case, the FEC decoder 15 processes one code word per unit time.

When the signal processor 20 operates in the 400 G mode, as illustrated in FIG. 11, the input bit stream is processed by the 200 G high-performance FEC decoder 31 and the 200 G low-performance FEC decoder 32 in parallel. As an example, the 200 G high-performance FEC decoder 31 and the 200 G low-performance FEC decoder 32 respectively process an input signal of 40000 bits. In this case, the FEC decoder 15 processes two code words per unit time.

FIG. 12A illustrates an example of the configuration of the FEC encoder according to the embodiments. The FEC encoder 2 is equipped with a 200 G high-performance FEC encoder 41, a 200 G low-performance FEC encoder 42, an FEC controller 43, and a combiner 44. The 200 G high-performance FEC encoder 41 performs error correction coding in a first scheme. The 200 G low-performance FEC encoder 42 performs error correction coding in a second scheme whose correction performance is lower than that of the first scheme. The error correction coding is realized by adding an error correction code (hereinafter, parity bits) to each code word block. In this case, the length of the parity bits added by the 200 G high-performance FEC encoder 41 is longer than the parity bits added by the 200 G low-performance FEC encoder 42.

The FEC controller 43 controls the 200 G high-performance FEC encoder 41 and the 200 G low-performance FEC encoder 42 according to the operation mode specified by mode control information. Specifically, when the capacity of the transmitted signal is smaller than or equal to a specified threshold (for example, when the signal processor 20 operates in the 200 G mode), the FEC controller 43 makes the 200 G high-performance FEC encoder 41 execute coding of the input bit stream. At this time, the FEC controller 43 may divide the input bit stream into a specified length and fed the divided bit streams to the 200 G high-performance FEC encoder 41. Meanwhile, when the capacity of the transmitted signal is larger than the threshold (for example, when the signal processor 20 operates in the 400 G mode), the FEC controller 43 makes the 200 G high-performance FEC encoder 41 and the 200 G low-performance FEC encoder 42 perform coding of the input bit stream in parallel. At this time, the FEC controller 43 may divide the input bit stream into a specified length and alternatingly fed the divided bit streams to the 200 G high-performance FEC encoder 41 and the 200 G low-performance FEC encoder 42. The combiner 44 combines the output signal of the 200 G high-performance FEC encoder 41 and the output signal of the 200 G low-performance FEC encoder 42 when the signal processor 20 operates in the 400 G mode.

FIG. 12B illustrates an example of the FEC decoder according to the embodiments. The FEC decoder 15 is equipped with the 200 G high-performance FEC decoder 31, the 200 G low-performance FEC decoder 32, an FEC controller 33, and a combiner 34. The 200 G high-performance FEC decoder 31 performs error correction in the first scheme. The 200 G low-performance FEC decoder 32 performs error correction in the second scheme. That is, the 200 G high-performance FEC decoder 31 detects and corrects the error of a signal encoded by the 200 G high-performance FEC encoder 41, and the 200 G low-performance FEC decoder 32 detects and corrects the error of a signal encoded by the 200 G low-performance FEC encoder 42.

The FEC controller 33 controls the 200 G high-performance FEC decoder 31 and the 200 G low-performance FEC decoder 32 according to the operation mode specified by mode control information. Meanwhile, the same mode information is used in the FEC encoder of the transmitting station and in the FEC decoder of the receiving station. Then, when the capacity of the transmitted signal is smaller than or equal to a specified threshold (for example, when the signal processor 20 operates in the 200 G mode), the FEC controller 33 makes the 200 G high-performance FEC decoder 31 perform the error correction process for the input bit stream. At this time, the FEC controller 33 gives the code word generated by the 200 G high-performance FEC encoder 41 implemented in the transmitting station to the 200 G high-performance FEC decoder 31. Meanwhile, when the capacity of the transmitted signal is larger than the threshold mentioned above (for example, when the signal processor 20 operates in the 400 G mode), the FEC controller 33 makes the 200 G high-performance FEC decoder 31 and the 200 G low-performance FEC decoder 32 perform the error correction process to the input bit stream in parallel. At this time, the FEC controller 33 gives the code words generated by the 200 G high-performance FEC encoder 41 and the 200 G low-performance FEC encoder 42 implemented in the transmitting station to the 200 G high-performance FEC decoder 31 and the 200 G low-performance FEC decoder 32, respectively. The combiner 34 combines the output signal of the 200 G high-performance FEC decoder 31 and the output signal of the 200 G low-performance FEC decoder 32 when the signal processor 20 operates in the 400 G mode.

As described above, in the combined FEC scheme, error correction is executed using the high-performance FEC (an FEC with a high error correction performance) when the transmission capacity is smaller than or equal to 200 Gbps. Therefore, when the transmission capacity is smaller than or equal to 200 Gbps, the characteristic A illustrated in FIG. 8 is obtained. On the other hand, when the transmission capacity is larger than 200 Gbps, error correction is executed using not only the high-performance FEC, but also the low-performance FEC (an FEC with a low error correction performance). Therefore, when the transmission capacity is larger than 200 Gbps, a characteristic that is approximately the same as the characteristic B illustrated in FIG. 8 is obtained. However, as explained in detail later, the signal processor of the embodiments is equipped with a function for improving the quality of a signal of the combined FEC scheme.

FIG. 13 presents a comparison of the circuit area of the FEC decoder. Here, in order to simplify the explanation, the configuration example 1 illustrated in FIG. 4, the configuration example 2 illustrated in FIG. 5, and the combined FEC configuration illustrated in FIG. 9 are compared under the following conditions. The circuit area is proportional to the transmission capacity. In addition, the circuit area of the high-performance FEC encoder per 100 Gbps is "3", and the circuit area of the low-performance FEC encoder per 100 Gbps is "1".

In this case, the FEC decoder 15 of the configuration example 1 is realized with the 400 G high-performance FEC encoder 15a, and therefore, its circuit area is "3×4=12". The FEC decoder 15 of the configuration example 2 is realized with the 200 G high-performance FEC encoder 15b and the 400 G low-performance FEC decoder 15c, and therefore, its circuit area is "3×2+1×4=10". The FEC decoder 15 of the combined FEC configuration is realized with the 200 G high-performance FEC decoder 31 and the 200 G low-performance FEC decoder 32, and therefore, its circuit area is "3×2+1×2=8". That is, compared with the configuration example 1, the circuit area of the FEC decoder is reduced by 33 percent according to the combined FEC configuration of the embodiments. In addition, compared with the configuration example 2, the circuit area of the FEC decoder is reduced by 20 percent according to the combined FEC configuration of the embodiments.

As discussed, according to the combined FEC configuration, the circuit area of the FEC decoder is reduced compared with the configuration examples 1 and 2. Particularly, compared with the configuration example 1, the circuit scale of the FEC decoder of the combined FEC configuration is reduced by a large mount. However, in the combined FEC configuration, the signal quality may deteriorate, not only in the case when it is compared with the configuration example 1, but also in the case when it is compared with the configuration example 2. Hereinafter, deterioration of the signal quality in the combined FEC configuration is explained.

Figure 14:
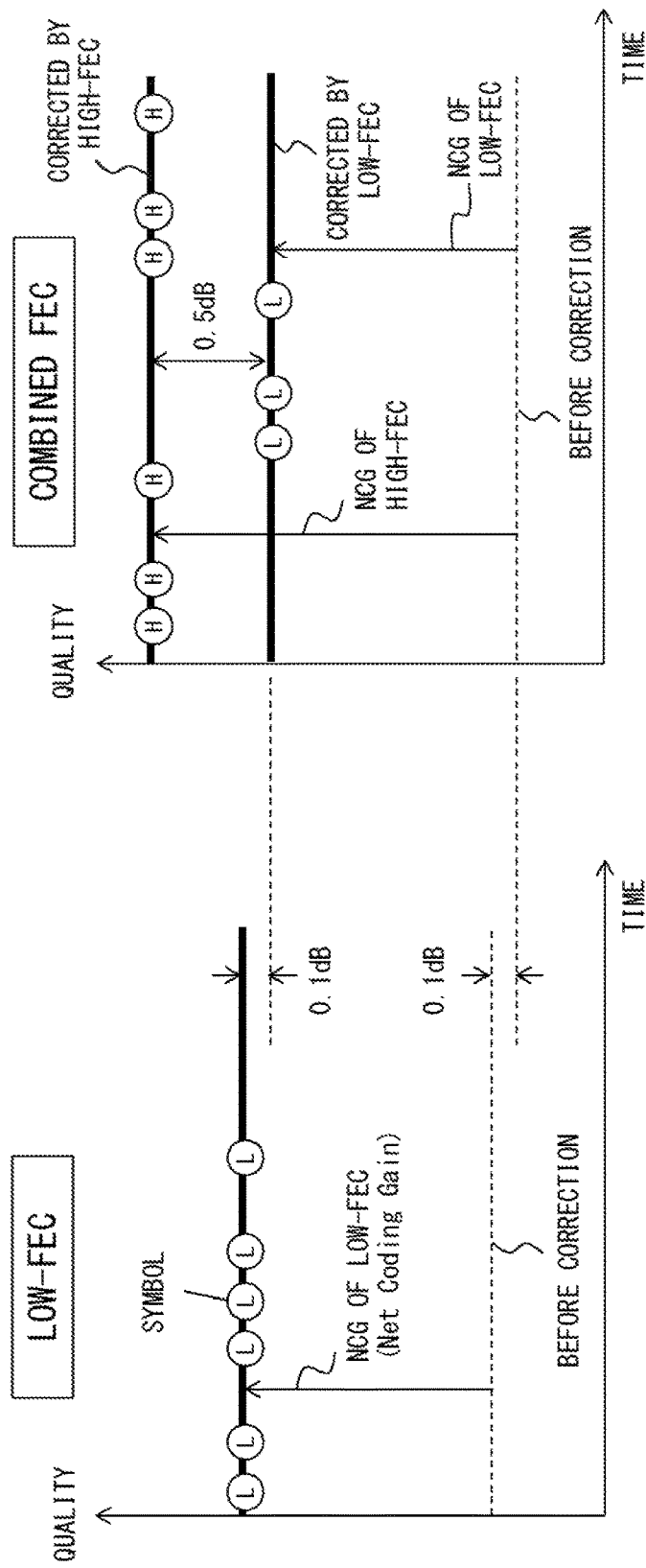
FIG. 14 illustrates an example of deterioration of the signal quality in a combined FEC configuration.

FIG. 14 is a diagram illustrating deterioration of the signal quality in the combined FEC configuration. In FIG. 14, "LOW-FEC" corresponds to the 400 G low-performance FEC decoder 15c illustrated in FIG. 5. In addition, "COMBINED FEC" corresponds to the combination of the 200 G high-performance FEC decoder 31 and the 200 G low-performance FEC decoder 32 illustrated in FIG. 9. Meanwhile, in this example, it is assumed that, in the high-performance FEC, a parity of 10200 bits is added to an input bit stream of 40000 bits. That is, error correction code of 25.5 percent of the payload are added. In addition, in the low-performance FEC, it is assumed that a parity of 8200 bits is added to an input bit stream of 40000 bits. That is, error correction code of 20.5 percent of the payload are added. Meanwhile, two code words are transmitted per unit time (here, 200 n seconds). In addition, it is assumed that DP-16QAM optical signals are transmitted between communication devices. In DP-16QAM, data of 8 bits are transmitted in one symbol time. Meanwhile, in the error correction scheme in which a parity is added to the payload, the longer the parity added to the payload, the higher the error correction performance.

In the case in which the conditions described above are applied, in the low-performance FEC scheme, two code words of 48200 bits are transmitted per unit time. Therefore, the transmission rate of the bit stream including parity is 482 Gbps, and the symbol rate is 60.25 Gbaud. Meanwhile, in the combined FEC scheme, a code word of 48200 bits and a code word of 50200 bits are transmitted in each unit time. Therefore, the transmission rate of the bit stream including parity is 492 Gbps, and the symbol rate is 61.5 Gbaud. That is, compared with the low-performance FEC scheme, the symbol rate of the combined FEC scheme becomes higher. Here, when the symbol rate becomes higher, a bit error becomes more likely to be caused. As a result, compared with the low-performance FEC scheme, the quality of the received signal in the combined FEC scheme deteriorates. As an example, the difference between the low-performance FEC scheme and the combined FEC scheme (that is, the amount of deterioration) in the quality of the received signal at the receiving station before correction is calculated by the formula below.

$$\text{Amount of deterioration}=10*\log(61.5/60.25)=0.1 \text{ dB}$$

When the error of the received signal is corrected in the combined FEC scheme, the quality of the code word processed in the high-performance FEC is higher than the quality of the code word processed in the low-performance FEC. In the example illustrated in FIG. 14, the difference between the low-performance FEC scheme and the high-performance FEC scheme is 0.5 dB. However, for example, when evaluating the maximum transmission distance, the signal quality is evaluated by the lowest quality. Therefore, the signal quality of the combined FEC scheme is lower than the low-performance FEC scheme. In the example illustrated in FIG. 14, compared with the low-performance FEC scheme, the signal quality of the combined FEC scheme is lower by 0.1 dB.

The signal processor of the embodiments of the present invention is equipped with a function for solving this problem. Hereinafter, first through six embodiments for solving this problem are explained.

Figure 15:
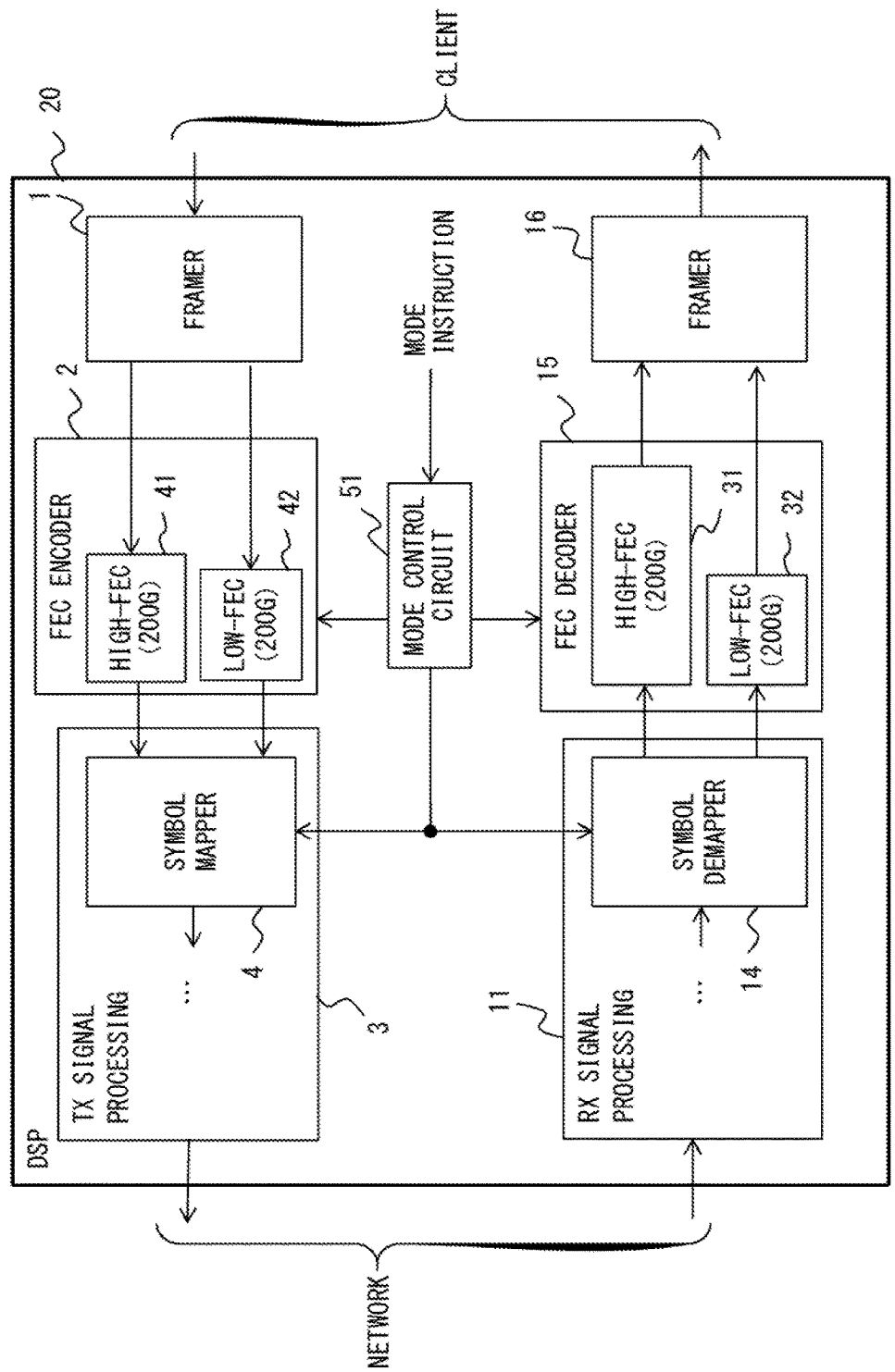
FIG. 15 illustrates an example of the configuration of a signal processor of the first through sixth embodiments.

FIG. 15 illustrates an example of the configuration of a signal processor of the first through sixth embodiments. The signal processor 20 of the first through sixth embodiments is equipped with a framer 1, an FEC encoder 2, a transmission signal processing unit 3, a received signal processing unit 11, an FEC decoder 15, a framer 16, and a mode control circuit 51. The framer 1, the FEC encoder 2, the transmission signal processing unit 3, the received signal processing unit 11, the FEC decoder 15, and the framer 16 are substantially the same in FIG. 9 and FIG. 15. Meanwhile, although it is omitted in FIG. 15, the FEC encoder 2 includes the FEC controller 43 and the combiner 44 illustrated in FIG. 12A, and the FEC decoder includes the FEC controller 33 and the combiner 34 illustrated in FIG. 12B.

The mode control circuit 51 controls the FEC encoder 2, the transmission signal processing unit 3, the received signal processing unit 11, and the FEC decoder 15 according to a mode instruction given from a network management system that is not illustrated in the drawing. The mode instruction includes information that specifies the transmission capacity. The mode instruction may further include information that specifies the FEC scheme, information that specifies the modulation scheme, and the like.

For example, the FEC encoder 2 determines the FEC encoder (41, 42) that is to be activated, according to mode control information given from the mode control circuit 51. The symbol mapper 4 provided in the transmission signal processing unit 3 controls the mapping process according to the mode control information. The symbol demapper 14 provided in the received signal processing unit 11 controls the demapping process according to the mode control information. The FEC decoder 15 determines the FEC decoder (31, 32) that is to be activated, according to the mode control information.

The mode instruction generated by the network management system is given to the transmitting station and the receiving station. For example, in the optical transmission system 500 illustrated in FIG. 1, the mode instruction is given respectively to the signal processor 20 provided in the communication device 510 and the signal processor 20 provided in the communication device 520. In addition, the mode instruction may also be given from a client. In this case, in each of the transmitting station and the receiving station, the user may generate a mode instruction and may give it to the signal processor 20.

First Embodiment

Figure 16:
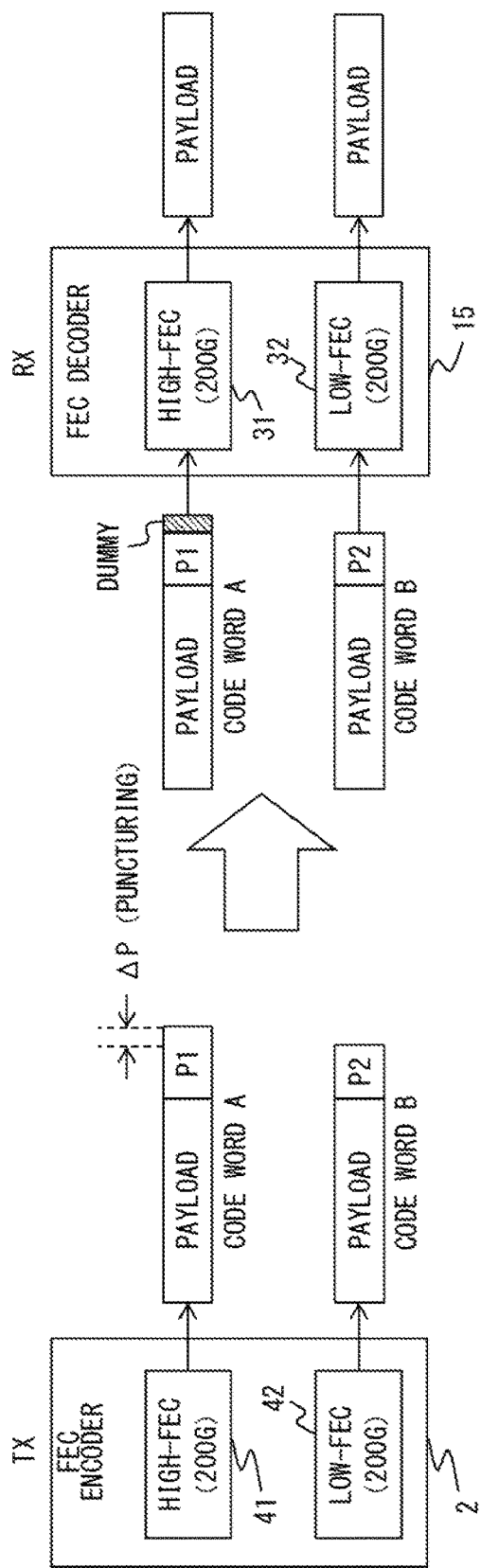
FIG. 16 illustrates an example of the operation in the first embodiment.

FIG. 16 illustrates an example of the operation in the first embodiment. In the example illustrated in FIG. 16, data of 80000 bits are transmitted per unit time. Therefore, data of 40000 bits are transmitted respectively in the high-performance FEC scheme and the low-performance FEC scheme. Meanwhile, data of 40000 bits is stored and transmitted in the payload of a frame, for example.

The high-performance FEC scheme adds parity P1 to the data of 40000 bits and generates a code word A. The low-performance FEC scheme adds parity P2 to data of 40000 bits and generates a code word B. The number of bits of the parity P1 is larger than that of the parity P2. In this example, the number of bits of the parity P1 is 10200 bits, and the number of bits of the parity P2 is 8200 bits.

In the transmitting station, the FEC encoder 2 reduces the number of bits of the parity P1 in the code word A generated in the high-performance FEC scheme. That is, puncturing is performed for the parity P1. The puncturing is performed by the combiner 44 illustrated in FIG. 12A, for example. Meanwhile, the number of bits deleted by the puncturing is a difference ΔP between the number of bits of the parity P1 and the number of bits of the parity P2, for example. In this case, 2000 bits are deleted from the parity P1. Then, the transmitting station generates a modulated optical signal from the code word B and the code word A for which the puncturing has been performed, and transmits the modulated optical signal to the receiving station. Meanwhile, it has been described that ΔP are deleted from the parity P1 in order to simplify the explanation, but in view of the nature of the error correction code, deletion of ΔP may be performed from any bit of the code word in which the payload and the parity are combined.

In the receiving station, the FEC decoder 15 processes the code word A using the 200 G high-performance FEC decoder 31, and processes the code word B using the 200 G low-performance FEC decoder 32. However, the 200 G high-performance FEC decoder 31 is configured to execute error correction using a parity of 10200 bits. Therefore, the FEC decoder 15 adds dummy parity bits to the received code word A. The number of bits of the dummy parity bits is the same as the number of bits deleted by the puncturing in the transmitting station. That is, in this example, dummy parity bits of 2000 bits are added to the code word A. Meanwhile, the addition of the dummy parity bits is performed by the FEC controller 33 illustrated in FIG. 12B, for example.

As described above, in the first embodiment, the symbol rate between the transmitting station and the receiving station becomes lower due to the deletion of some parity bits in the code word generated in the high-performance FEC scheme. As a result, the quality of the received signal at the receiving station improves. That is, the quality of the signal at the receiving station before correction is improved by the execution of puncturing.

Figure 17:
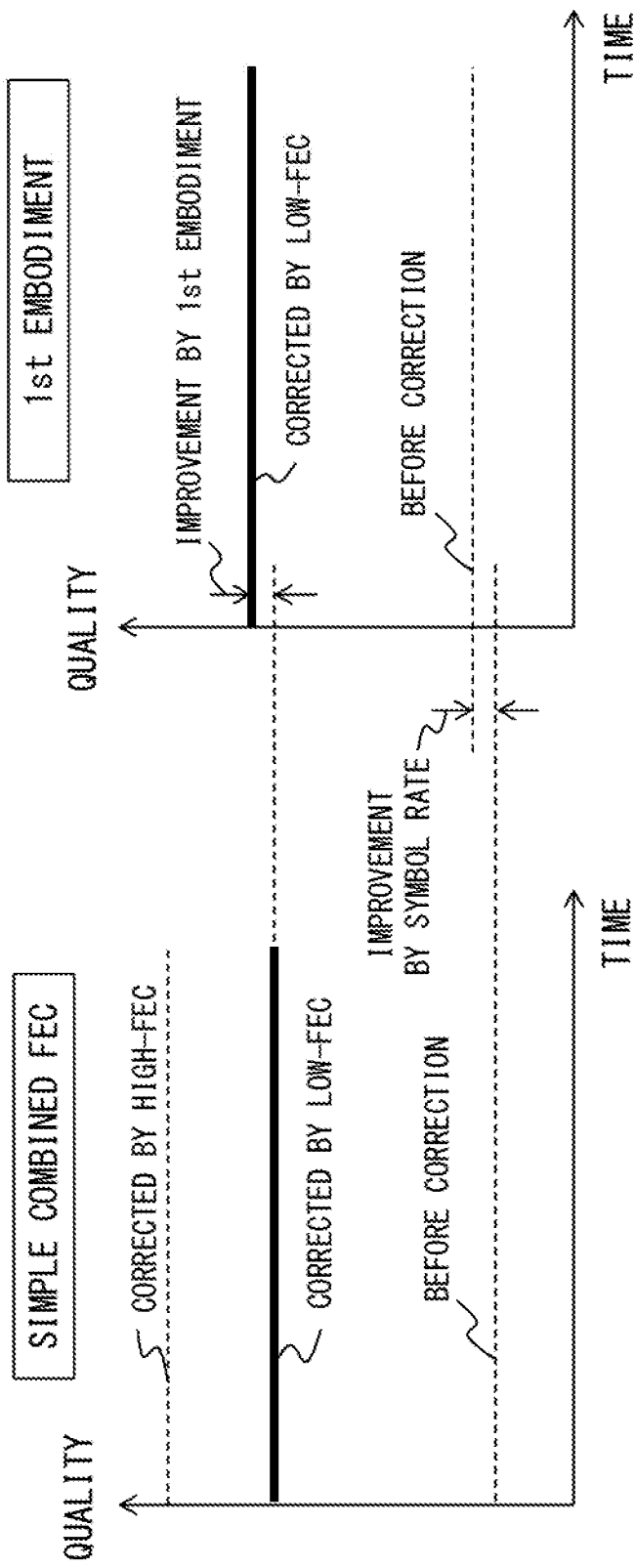
FIG. 17 illustrates the effect of the first embodiment.

FIG. 17 illustrates the effect of the first embodiment. Meanwhile, in FIG. 17, "SIMPLE COMBINED FEC" corresponds to the case in which the puncturing of the first embodiment is not performed in the configuration illustrated in FIG. 12A or 12B.

Compared with the simple combined FEC, the symbol rate between the transmitting station and the receiving station becomes lower in the first embodiment. For this reason, compared with the simple combined FEC, the quality of the signal received by the receiving station (that is, the quality of the signal at the receiving station before correction) becomes higher in the first embodiment. Here, the Net Coding Gain (NCG) of the low-performance FEC is substantially the same in the simple combined FEC and in the first embodiment. Therefore, comparing the signals after execution of error correction in the low-performance FEC, the signal quality becomes higher in the first embodiment than in the simple combined FEC.

Meanwhile, in the first embodiment, some parity bits of the high-performance FEC are deleted, and therefore, the net coding gain according to the high-performance FEC becomes smaller. However, as was explained with reference to FIG. 16, the number of bits of the parity of the high-performance FEC after the puncturing is the same as that of the parity of the low-performance FEC. Therefore, in the first embodiment, the signal quality after correction in the high-performance FEC does not fall below the signal quality after correction in the low-performance FEC. Thus, in the FEC scheme of the first embodiment, the lowest signal quality is improved by allocating a portion of the net coding gain of the high-performance FEC to the low-performance FEC. As a result, the maximum transmission distance becomes longer.

Second Embodiment

FIGS. 18A and 18B illustrate an example of the operation in the second embodiment. In the examples illustrated in FIGS. 18A and 18B, the code word A and the code word B are transmitted in the high-performance FEC scheme and in the low-performance FEC scheme, respectively. In addition, it is assumed that the code word A and the code word B are transmitted in the same modulation scheme. In the examples illustrated in FIGS. 18A and 18B, the code word A and the code word B are modulated in 16QAM. 16QAM transmits 4 bits in one symbol.

In the simple combined FEC scheme, as illustrated in FIG. 18A, the code word A generated in the high-performance FEC scheme and the code word B generated in the low-performance FEC scheme are transmitted at the same power. That is, when the value of 4 bits in a symbol A in the code word A and the value of 4 bits in a symbol B in the code word B are the same, the transmission power of the symbol A and the transmission power of the symbol B are the same as each other. In the description below, symbol mapping executed in the simple combined FEC scheme may be referred to as "medium-power mapping (medium mapping)".

In the second embodiment, as illustrated in FIG. 18B, the transmission power of the code word A generated in the high-performance FEC scheme and the transmission power of the code word B generated in the low-performance FEC scheme are different from each other. Specifically, the transmission power of the code word A generated in the high-performance FEC scheme is set lower than the transmission power of the code word B generated in the low-performance FEC scheme. The transmission power of each symbol is specified by the symbol mapper 4 illustrated in FIG. 15. Meanwhile, in the description below, symbol mapping executed with respect to the high-performance FEC may be referred to as "low-power mapping (low mapping)", and symbol mapping executed with respect to the low-performance FEC may be referred to as "high-power mapping (high mapping)".

Figure 19:
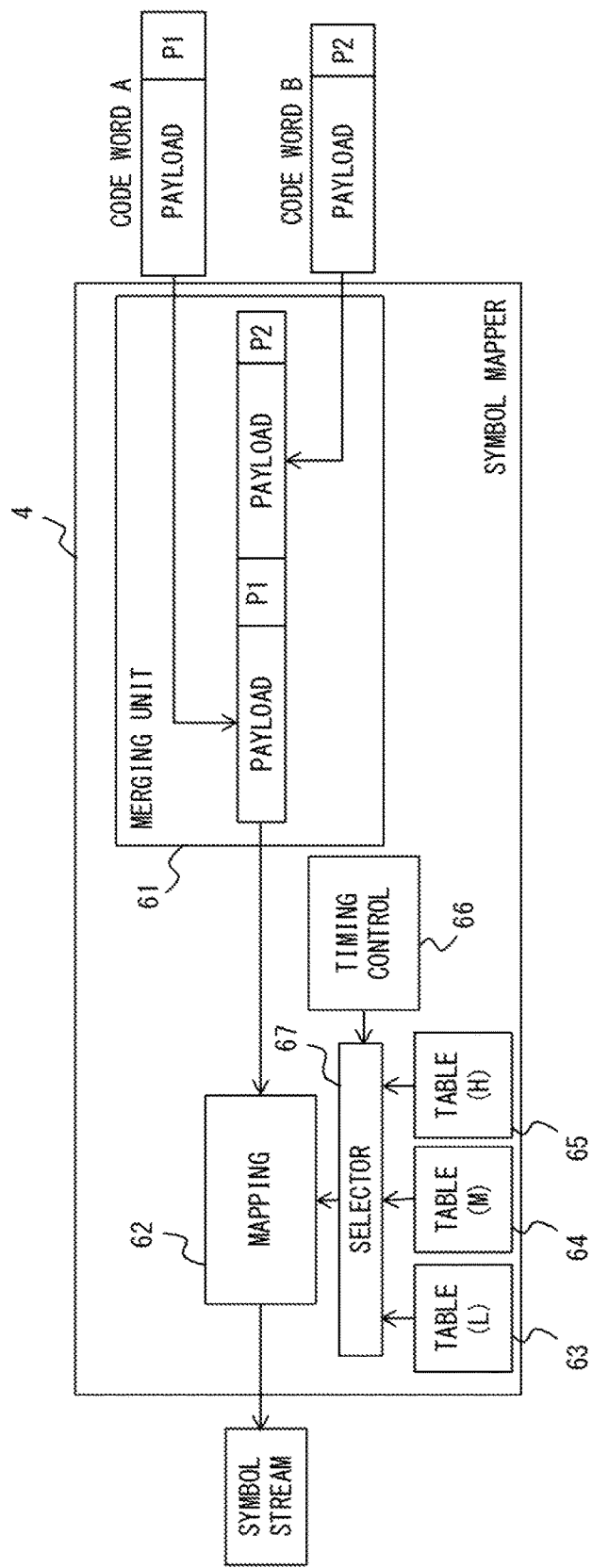
FIG. 19 illustrates an example of a symbol mapper used in the second embodiment.

FIG. 19 illustrates an example of the symbol mapper 4 used in the second embodiment. In this example, the symbol mapper 4 is equipped with a merging unit 61, a mapping circuit 62, a low-power mapping table 63, a medium-power mapping table 64, a high-power mapping table 65, a timing control circuit 66, and a selector circuit 67. The merging unit 61 merges the code word A and the code word B generated by the FEC encoder 2. In this example, the merging unit 61 merges the code words generated by the FEC encoder 2 so that the code word A generated in the high-performance FEC scheme and the code word B generated in the low-performance FEC scheme are alternatingly output. Meanwhile, the number of bits of the parity P1 is larger than that of the parity P2, and therefore, the bit length of the code word A is longer than that of the code word B. The mapping circuit 62 performs mapping of the input bit stream to symbols, using the mapping tables 63-65. The low-power mapping table 63 stores mapping information for performing low-power mapping. The medium-power mapping table 64 stores mapping information for performing medium-power mapping. The high-power mapping table 65 stores mapping information for performing high-power mapping.

FIGS. 20A-20C illustrate examples of the mapping tables. FIG. 20A illustrates an example of the low-power mapping table 63 that stores mapping information for low-power mapping. FIG. 20B illustrates an example of the medium-power mapping table 64 that stores mapping information for medium-power mapping. FIG. 20C illustrates an example of the high-power mapping table 65 that stores mapping information for high-power mapping. In this example, the modulation scheme is 16QAM. Therefore, each of the mapping tables 63-65 stores mapping information representing a pair of an I-component value and a Q-component value with respect to data of 4 bits.

The timing control circuit 66 gives a selection timing instruction to the selector circuit 67 according to the operation mode and the type of the input code word. The selector circuit 67 selects the mapping table 63-65 according to the selection timing instruction given from the timing control circuit 66.

For example, in the 200 G mode, the selector circuit 67 selects the medium-power mapping table 64. In this case, the mapping circuit 62 refers to the medium-power mapping table 64 illustrated in FIG. 19 for every 4 bits, and determines the I-component value and the Q-component value of the corresponding symbol. In the 400 G mode, the selector circuit 67 alternatingly selects the low-power mapping table 63 and the high-power mapping table 65, according to the selection timing instruction. That is, for the code word A generated in the high-performance FEC scheme, the mapping circuit 62 refers to the low-power mapping table 63 illustrated in FIG. 19 for every 4 bits, and determines the I-component value and the Q-component value of the corresponding symbol. Meanwhile, for the code word B generated in the low-performance FEC scheme, the mapping circuit 62 refers to the high-power mapping table 65 illustrated in FIG. 19 for every 4 bits, and determines the I-component value and the Q-component value of the corresponding symbol.

Figure 21:
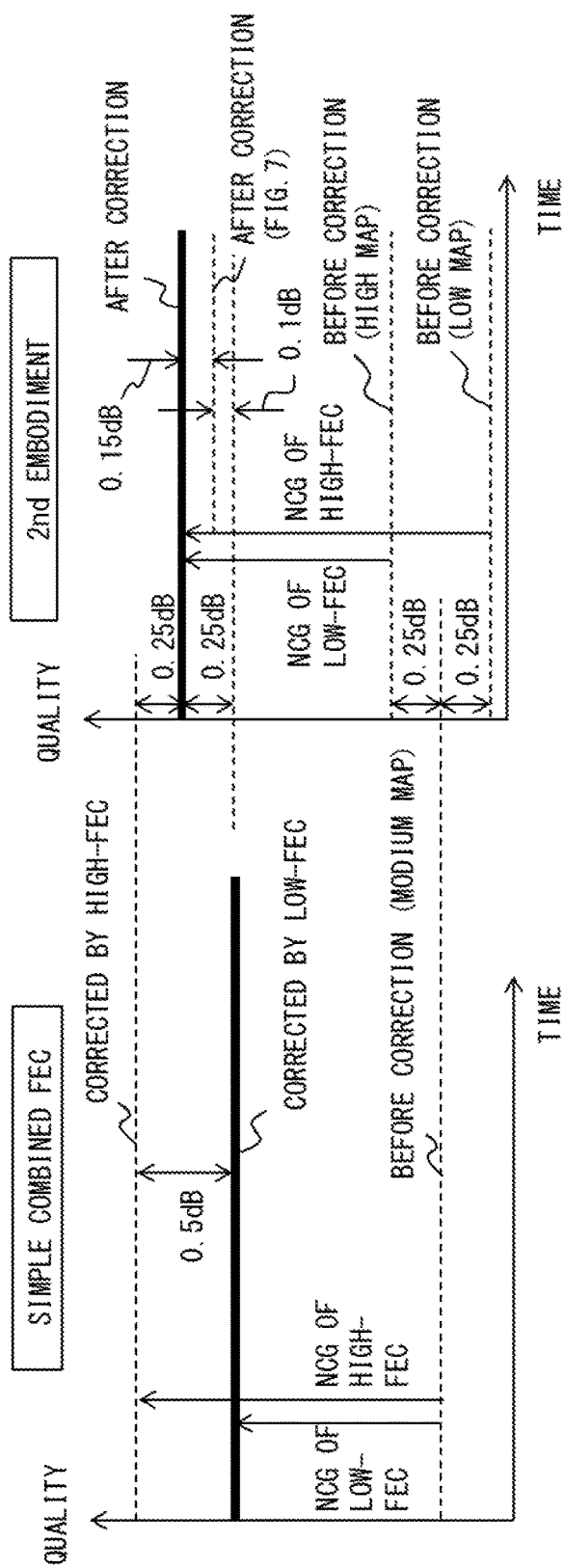
FIG. 21 illustrates the effect of the second embodiment.

FIG. 21 illustrates the effect of the second embodiment. Meanwhile, in FIG. 21, "SIMPLE COMBINED FEC" corresponds to the case in which medium-power mapping is performed for all code words.

When coding is performed in the simple combined FEC scheme, mapping is performed with the same power for the code word generated in the high-performance FEC scheme and the code word generated in the low-performance FEC scheme. Therefore, the quality of the signal corrected using the high-performance FEC is higher than the quality of the signal corrected using the low-performance FEC. In this example, the difference between the net coding gain of the high-performance FEC and the net coding gain of the low-performance FEC is 0.5 dB. Then, as illustrated in FIG. 21, the difference $\Delta Q$ between the quality of the signal corrected using the high-performance FEC and the quality of the signal corrected using the low-performance FEC is 0.5 dB.

In the second embodiment, the code word generated in the high-performance FEC scheme is transmitted at a low power, and the code word generated in the low-performance FEC scheme is transmitted at a high power. At this time, it is preferable that the average transmission power in the second embodiment be approximately the same as the average transmission power in the case in which the simple combined FEC scheme is executed. For example, the code word generated in the high-performance FEC scheme is mapped so as to be transmitted at a power that is lower by half of the difference ΔQ (that is, 0.25 dB), compared with that in the simple combined FEC scheme. Meanwhile, the code word generated in the low-performance FEC scheme is mapped so as to be transmitted at a power that is higher by half of the difference ΔQ (that is, 0.25 dB), compared with that in the simple combined FEC scheme. Then, the quality of the signal corrected in the high-performance FEC and the quality of the signal corrected in the low-performance FEC become substantially the same each other. Specifically, as illustrated in FIG. 21, compared with the quality of the signal corrected in the low-performance FEC in the simple combined FEC scheme, the quality of the signal corrected by the FEC of the second embodiment becomes higher by 0.25 dB.

Meanwhile, in the case in which all data signals are corrected in the low-performance FEC (that is, the operation in the configuration example 2 illustrated in FIG. 7), the quality of the signal before correction becomes higher by 0.1 dB compared with the simple combined FEC scheme, as explained with reference to FIG. 14. Therefore, the quality of the signal corrected according to the second embodiment improves by 0.15 dB compared with the operation in the configuration example 2 illustrated in FIG. 7.

As described above, in the second embodiment, the lowest quality after correction is improved by making the transmission power of the signal to which the high-performance FEC is applied lower and also making the transmission power of the signal to which the low-performance FEC is applied higher. That is, also in the FEC scheme of the second embodiment, the lowest signal quality is improved by allocating a portion of the net coding gain of the high-performance FEC to the low-performance FEC. As a result, the maximum transmission distance becomes longer.

Third Embodiment

Figure 22:
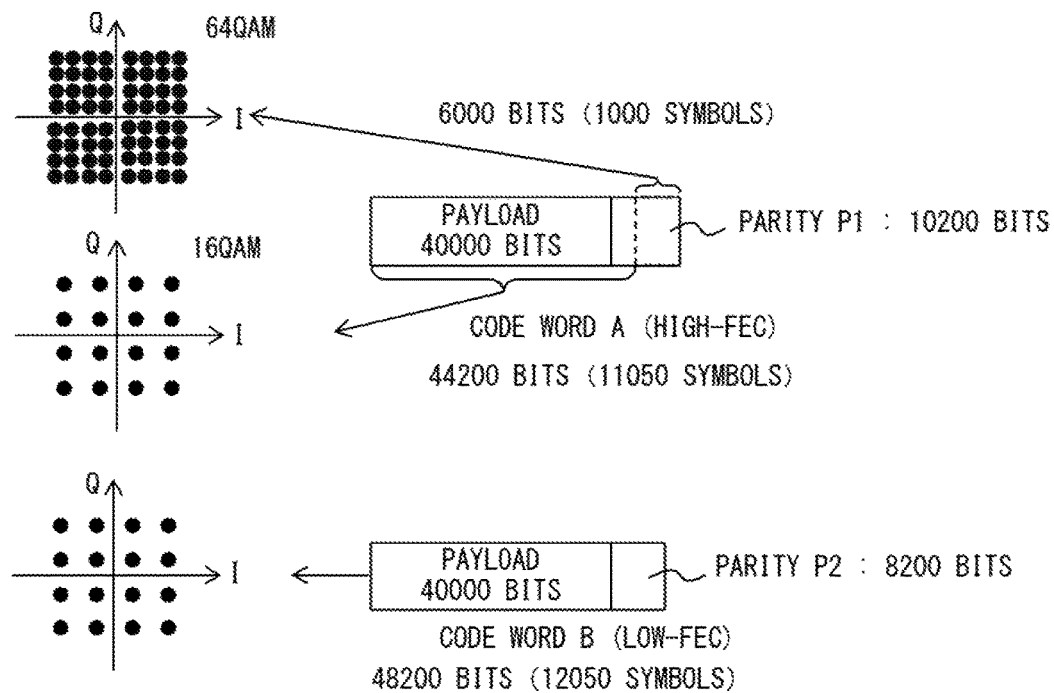
FIG. 22 illustrates an example of the operation in the third embodiment.

FIG. 22 illustrates an example of the operation in the third embodiment. In the example illustrated in FIG. 22, the input bit stream is divided into 40000 bits and encoded. The high-performance FEC encoder 41 adds parity P1 of 10200 bits to the payload of 40000 bits to generate the code word A. The low-performance FEC encoder 42 adds parity P2 of 8200 bits to the payload of 40000 bits to generate the code word B.

Here, it is assumed that the code word A and the code word B are transmitted in 16QAM. In this case, each symbol transmits 4 bits. Therefore, the code word A is transmitted using 12550 symbols, and the code word B is transmitted using 12050 symbols.

In the third embodiment, the number of symbols required for transmitting the code word A generated in the high-performance FEC scheme is reduced so that the number of symbols required for transmitting the code word A generated in the high-performance FEC scheme and the number of symbols required for transmitting the code word B generated in the low-performance FEC scheme become the same. Specifically, the modulation scheme of the code word A is controlled so that the code word A is transmitted using 12050 symbols.

In order to realize the operation described above, the symbol mapper 4 performs mapping of the code word B generated in the low-performance FEC scheme in a first modulation scheme (here, 16QAM), and also performs mapping of at least a portion of the code word A generated in the high-performance FEC scheme in a modulation scheme (for example, 64QAM) in which the number of bits per symbol is larger than that of the first modulation scheme. Specifically, in the code word A of 50200 bits, 44200 bits are mapped to 16QAM symbols, and the remaining 6000 bits are mapped to 64QAM symbols. As a result, the code word A generated in the high-performance FEC scheme and the code word B generated in the low-performance FEC scheme are both transmitted using 12050 symbols. Meanwhile, in the receiving station, the symbol demapper 14 controls the demapping process according to the mapping of the symbol mapper 4 of the transmitting station.

As described above, according to the third embodiment, the symbol rate of the signal transmitted between the transmitting station and the receiving station is the same as in the case in which all data signals are encoded in the low-performance FEC scheme. That is, compared with the simple combined FEC scheme, the average symbol rate decreases according to the FEC scheme of the third embodiment. Therefore, the problem explained with reference to FIG. 14 is solved, and the maximum transmission distance becomes longer.

Variation Example 1 of the Third Embodiment

In the example illustrated in FIG. 22, the code word A and the code word B have the length of 50200 bits and 48200 bits, respectively, and as the modulation scheme, 16QAM and 64QAM are applied. However, depending on the length of the code word of the high-performance FEC scheme/the low-performance FEC scheme, or the selection of the modulation scheme, there are some cases in which it is impossible to apply the third embodiment as it is.

For example, an operation is considered in which the symbol mapper 4 performs mapping of the code word B generated in the low-performance FEC scheme in a first modulation scheme (here, 16QAM), and also performs mapping of at least a portion of the code word A generated in the high-performance FEC scheme in a modulation scheme (for example, 128QAM) in which the number of bits per symbol is larger than that of the first modulation scheme. However, in the combinations of 16QAM symbols and 128QAM symbols, no combination of the number of symbols exists for transmitting the code word A generated in the high-performance FEC scheme exactly using 24100 symbols. For example, when 11384 16QAM symbols and 666 128QAM symbols are combined, the total number of bits is 50198, and when 11383 16QAM symbols and 667 128QAM symbols are combined, the total number of bits is 50201. That is, no combination exists in which the total number of symbols is 24100 and the total number of bits is 50200.

In order to handle this problem, a redundant bit is added to the code word A or the code word B (here, the code word A). For example, a redundant bit of 1 bit is added to the code word A of 50200 bits so as to generate a code word of 50201 bits. In this code word, 45532 bits are mapped to 11383 16QAM symbols, and the remaining 4669 bits are mapped to 667 128QAM symbols. As a result, the code word A generated in the high-performance FEC scheme and the code word B generated in the low-performance FEC scheme are both transmitted using 12050 symbols. Meanwhile, in the receiving station, the symbol demapper 14 controls the demapping process according to the mapping of the symbol mapper 4 of the transmitting station, and at that time, the redundant bit added at the transmitting side is deleted.

As described above, according to the variation example 1 of the third embodiment, the symbol rate of the signal transmitted between the transmitting station and the receiving station is the same as in the case in which all data signals are encoded in the low-performance FEC scheme. That is, compared with the simple combined FEC scheme, the average symbol rate decreases according to the FEC scheme of the variation example 1 of the third embodiment. Therefore, the problem explained with reference to FIG. 14 is solved, and the maximum transmission distance becomes longer.

Variation Example 2 of the Third Embodiment

The operation in the variation example 1 of the third embodiment may also be realized with another method. That is, according to the variation example 2 of the third embodiment, some bits are deleted in the code word A or the code word B (here, the code word A). That is, puncturing is applied to the code word A.

In an example according to the variation example 2 of the third embodiment, some bits of the code word A of 50200 bits are deleted. In the description below, 2 bits are deleted from the code word A. That is, a code word of 50198 bits is generated by puncturing. Then, in the 50198 bits, 45536 bits are mapped to 11384 16QAM symbols, and the remaining 4662 bits are mapped to 666 128QAM symbols. As a result, the code word A generated in the high-performance FEC scheme and the code word B generated in the low-performance FEC scheme are both transmitted using 12050 symbols. Meanwhile, in the receiving station, the symbol demapper 14 controls the demapping process according to the mapping of the symbol mapper 4 of the transmitting station. At that time, a dummy bit is added to the position of the bit deleted at the transmitting side.

As described above, according to the variation example 2 of the third embodiment, the symbol rate of the signal transmitted between the transmitting station and the receiving station is the same as in the case in which all data signals are encoded in the low-performance FEC scheme. That is, compared with the simple combined FEC scheme, the average symbol rate decreases according to the FEC scheme of the variation example 2 of the third embodiment. Therefore, the problem explained with reference to FIG. 14 is solved, and the maximum transmission distance becomes longer.

Meanwhile, the variation example 1 and the variation example 2 of the third embodiment offer a similar solution for the same problem, but the superiority in performance between them depends on the situation, and there is no definite conclusion. For example, the variation example 1 is slightly-inferior in regard to the bit error rate before FEC correction is performed, because symbols for which the number of bits per symbol is larger are to be transmitted at a larger proportion. Meanwhile, the variation example 1 is slightly better in the FEC correction performance because, unlike the variation example 2, puncturing is not performed. Therefore, superiority in the overall performance is to be determined by factors such as the combination of the modulation schemes to be used, the characteristic of the transmission link, and the like.

Fourth Embodiment

Figure 23:
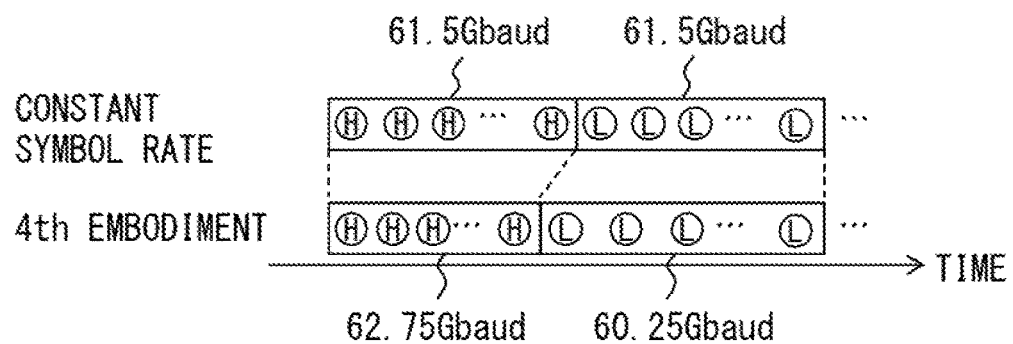
FIG. 23 illustrates an example of the operation in the fourth embodiment.

FIG. 23 illustrates an example of the operation of the fourth embodiment. In the example illustrated in FIG. 23, the high-performance FEC encoder 41 adds a parity of 10200 bits to the payload of 40000 bits to generate the code word A. The low-performance FEC encoder 42 adds a parity of 8200 bits to the payload of 40000 bits to generate the code word B. The unit time is 200 n seconds in this example. In addition, it is assumed that the data signal is transmitted in DP-16QAM.

Here, a case is assumed in which the code word A generated in the high-performance FEC scheme and the code word B generated in the low-performance FEC scheme are transmitted at the same symbol rate. In the description below, this scheme may be referred to as a "constant symbol rate scheme".

In the constant symbol rate scheme, under the conditions described above, the symbol stream of the code word A and the symbol stream of the code word B are both transmitted at 61.5 Gbaud, as illustrated in FIG. 23. In this case, compared with the signal processed in the high-performance FEC scheme, the quality of the signal processed in the low-performance FEC scheme becomes lower. That is, the lowest quality of an optical transmission system is to be determined by the quality of the signal processed in the low-performance FEC scheme.

Then, in the fourth embodiment, the transmission signal processing unit 3 makes the symbol rate of the code word A generated in the high-performance FEC scheme higher, and also makes the symbol rate of the code word B generated in the low-performance FEC scheme lower, compared with those in the constant symbol rate scheme. Preferably, the transmission signal processing unit 3 will make the symbol rate of the code word A generated in the high-performance FEC scheme higher by $\Delta R$, and will make the code word B generated in the low-performance FEC scheme lower by $\Delta R$, so that the average symbol rate of the constant symbol rate scheme is maintained. In the example illustrated in FIG. 23, the symbol stream of the code word A is transmitted at 62.75 Gbaud, and the symbol stream of the code word B is transmitted at 60.25 Gbaud. The amount of change $\Delta R$ for the symbol rate may also be determined according to the difference in the net coding gains of the high-performance FEC and the low-performance FEC. Meanwhile, in the receiving station, the received signal processing unit 11 may change the speed of signal processing for the period in which the symbol stream representing the code word A is received, and for the period in which the symbol stream representing the code word B is received.

As described above, in the fourth embodiment, the difference in net coding gains of high-performance FEC and the low-performance FEC is converted into the symbol rate and allocated to the low-performance FEC. Therefore, the quality of the signal processed in the low-performance FEC scheme is improved, and the lowest quality of an optical transmission system improves.

Fifth Embodiment

FIG. 24 illustrates an example of the operation of the fifth embodiment. In the fifth embodiment, a pair of bits in the code word generated in the high-performance FEC scheme and bits in the code word generated in the low-performance FEC scheme is allocated to one symbol.

In the example illustrated in FIG. 24, the data signal is transmitted in 16QAM. In 16QAM, 4 bits are transmitted in one symbol. Therefore, the transmission signal processing unit 3 extracts two bits (hereinafter, bits a, b) from the code word A generated in the high-performance FEC scheme and extracts two bits (hereinafter, bits c, d) from the code word B generated in the low-performance FEC scheme. Then, the transmission signal processing unit 3 determines electrical field information of the symbol according to the value of the bit stream abcd.

Compared with the signal processed in the high-performance FEC scheme, the bit error is prone to remain after correction in the signal processed in the low-performance FEC scheme. Here, when recovering data from a received symbol in the receiving station by demapping, the error is less likely to be caused by deciding a quadrant of the constellation, than by deciding each signal point. Therefore, the bits cd extracted from the code word B generated in the low-performance FEC scheme are used for deciding a quadrant of the constellation. For example, when the values of bits cd are "00", the first quadrant is selected. Meanwhile, the bits ab extracted from the code word A generated in the high-performance FEC scheme are used for deciding a signal point in the selected quadrant. For example, when the bit stream abcd is "0100", the first quadrant is selected according to "cd=00", and a signal point C is selected in the first quadrant according to "ab=01". Meanwhile, in the receiving station, the symbol demapper 14 controls the demapping process according to the mapping of the symbol mapper 4 of the transmitting station.

As described above, in the fifth embodiment, a bit stream obtained from a signal generated in the high-performance FEC scheme and a signal generated in the low-performance FEC scheme is mapped to one symbol, so that an decision error of the signal generated in the low-performance FEC scheme becomes less likely to be caused. As a result, the quality of the signal processed in the low-performance FEC scheme is improved, and the lowest quality of the optical transmission system improves.

Meanwhile, the number of bits of the code word generated in the high-performance FEC scheme is larger than the number of bits of the code word generated in the low-performance FEC scheme. For this reason, when the symbol mapping in the fifth embodiment is executed, a portion of the bit stream of the code word generated in the high-performance FEC scheme remains without being mapped. For example, in a case in which the 200 G high-performance FEC decoder 31 adds a parity of 10200 bits to the payload, and the 200 G low-performance FEC decoder 32 adds a parity of 8200 bits to the payload, 2000 bits in each code word generated by the 200 G high-performance FEC decoder 31 remain. Therefore, in this case, the FEC encoder 2 or the transmission signal processing unit 3 may add dummy bits (for example, padding) to the code word generated by the 200 G low-performance FEC decoder 32, so that the number of bits of the code word generated by the 200 G high-performance FEC decoder 31 and the number of bits of the code word generated by the 200 G low-performance FEC decoder 32 become the same. Alternatively, the residual bits may be transmitted in the normal modulation scheme. For example, the residual bits may be divided into 4 bits, and each of the 4-bit signals may be mapped to a 16QAM symbol.

Sixth Embodiment

Figure 25:
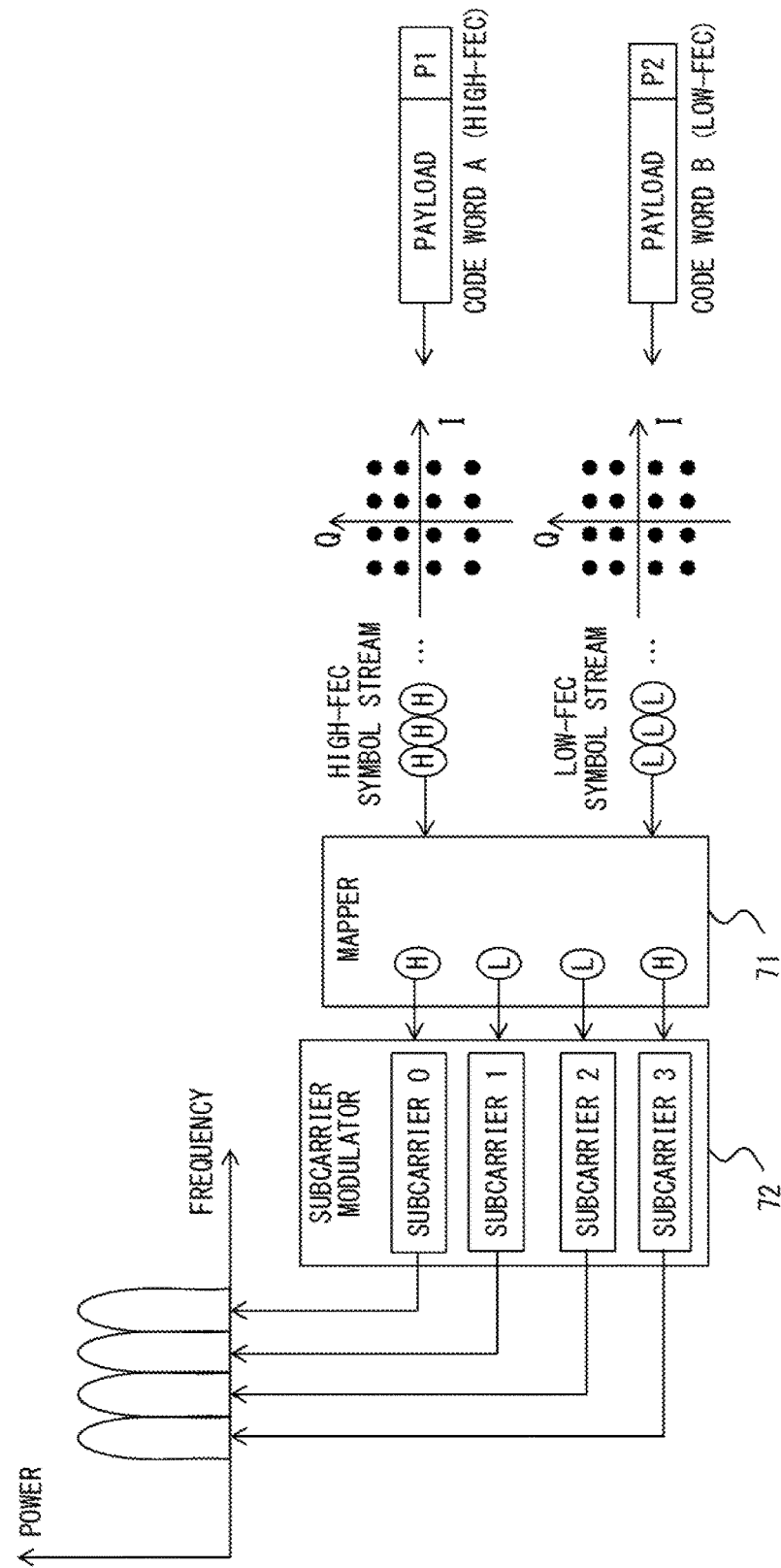
FIG. 25 illustrates an example of the operation in the sixth embodiment.

FIG. 25 illustrates an example of the operation in the sixth embodiment. In the optical transmission system according to the six embodiment, data are transmitted using a plurality of subcarriers of different frequencies. The plurality of subcarriers are transmitted using one wavelength, for example.

It is assumed that the characteristic of each carrier is known. For example, the characteristic of each subcarrier is measured in advance by transmitting a probe signal from the transmitting station to the receiving station for each subcarrier. Alternatively, the characteristic of each subcarrier may be calculated by simulation. In the example illustrated in FIG. 25, it is assumed that the characteristics of the subcarriers 0, 3 are bad, and the characteristics of the subcarriers 1, 2 are good.

The transmission signal processing unit 3 of the transmitting station is equipped with a subcarrier mapper 71 and a subcarrier modulator 72, as illustrated in FIG. 25. The subcarrier mapper 71 allocates the symbol stream generated by the symbol mapper 4 to the corresponding subcarrier. Specifically, the subcarrier mapper 71 allocates the symbol stream that includes the code of the high-performance FEC scheme to the subcarriers 0, 3 having bad characteristics, and allocates the symbol stream that includes the code of the low-performance FEC scheme to the subcarriers 1, 2 having good characteristics. The subcarrier modulator 72 modulates each subcarrier according to the symbol stream allocated by the subcarrier mapper 71. The subcarrier modulator 72 may be realized with the pre-equalizer (Tx_EQ) 4 illustrated in FIG. 3.

A multi-carrier signal is generated by combining a plurality of subcarrier signals. The front-end circuit modulates carrier light by this multi-carrier signal and outputs the modulated carrier light. Meanwhile, in the receiving station, the received signal processing unit 11 is equipped with a subcarrier demapper corresponding to the subcarrier mapper 71 of the transmitting station.

As described above, in the sixth embodiment, the symbol that carries a code of the low-performance FEC scheme is allocated to the subcarriers having good characteristics. Therefore, the quality of the signal processed in the low-performance FEC scheme is improved, and the lowest quality of the optical transmission system improves.

FIG. 26 presents a comparison of the size and signal quality of the FEC decoder. Here, the configuration example 1 illustrated in FIG. 4, the configuration example 2 illustrated in FIG. 5, the simple combined FEC configuration, and the first-fourth embodiments are compared. "SIMPLE COMBINED FEC" represents the case in which, in the configuration illustrated in FIG. 9, the processes of the first through sixth embodiments are not performed. "SIMPLE COMBINED FEC" represents a case in which the operations of the first through sixth embodiments are not performed in a configuration illustrated in FIG. 9. However, "SIMPLE COMBINED FEC" is also one of the embodiments of the present invention. The bit rate of data transmitted between the transmitting station and the receiving station is 400 Gbps. This data signal is transmitted in DP-16QAM.

According to the embodiments of the present invention, the circuit scale of the FEC decoder is reduced compared with the configuration example 1 or the configuration example 2. Particularly, compared with the configuration example 1, the circuit scale of the FEC decoder of the embodiments is reduced by a large amount.

The quality of the signal after correction in the simple combined FEC scheme may become lower than that in configuration example 2. However, when the processes in the first through fourth embodiments are performed, the quality of the signal after error correction does not become lower than that in the configuration example 2. That is, according to the first through fourth embodiment, the circuit scale of the FEC decoder may be made small without deterioration in the quality of the signal, compared with the configuration example 2.

FIGS. 27A and 27B illustrate an example of the operation of other embodiments. In FIGS. 27A and 27B, "HIGH" represents a symbol to which the output signal of the high-performance FEC encoder is mapped, and "LOW" represents a symbol to which the output signal of the low-performance FEC encoder is mapped.

In the optical transmission system according to the embodiments of the present invention, when the transmission capacity is large, the code word generated in the high-performance FEC scheme (high-performance FEC code word) and the code word generated in the low-performance FEC scheme (low-performance FEC code word) are transmitted. Here, the optical transmission system may alternatingly transmit the high-performance FEC code word and low-performance FEC code word, as illustrated in FIG. 27A.

In this regard, in another embodiment, the optical transmission system may alternatingly transmit one symbol to which the output signal of the high-performance FEC encoder is mapped and one symbol to which the output signal of the low-performance FEC encoder is mapped, as illustrated in FIG. 27B. According to this scheme, a further improvement in the signal quality is expected in the second and third embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An error correction circuit that processes a signal to which an error correction code is added, the error correction circuit comprising:
    a first error correction circuit configured to perform an error correction in a first correction scheme;
    a second error correction circuit configured to perform an error correction in a second correction scheme, a correction performance of the second correction scheme being lower than a correction performance of the first correction scheme; and
    a controller configured to make the first error correction circuit perform error correction of a received signal when a capacity of the received signal is smaller than or equal to a processing capacity of the first error correction circuit, and make both of the first error correction circuit and the second error correction circuit perform error correction of the received signal in parallel when the capacity of the received signal is larger than the processing capacity of the first error correction circuit.

2. An optical transmission system that includes a first communication device equipped with an error correction code encoder and a second communication device equipped with an error correction code decoder to process a signal received from the first communication device, wherein
    the error correction code encoder includes:
        a first encoder configured to perform an error correction encoding in a first correction scheme;
        a second encoder configured to perform error correction encoding in a second correction scheme, a correction performance of the second correction scheme being lower than a correction performance of the first correction scheme; and
        a first controller configured to make the first encoder perform error correction encoding on a transmission signal transmitted from the first communication device to the second communication device when a capacity of the transmission signal is smaller than or equal to a specified threshold, and make the first encoder and the second encoder perform error correction encoding on the transmission signal when the capacity of the transmission signal is larger than the threshold, and wherein
    the error correction code decoder includes:
        a first decoder configured to perform error correction in the first correction scheme;
        a second decoder configured to perform error correction in the second correction scheme; and
        a second controller configured to make the first decoder perform error correction of the transmission signal when the capacity of the transmission signal is smaller than or equal to the threshold, and make both of the first decoder and the second decoder perform error correction of the transmission signal in parallel when the capacity of the transmission signal is larger than the threshold.

3. The optical transmission system according to claim 2, wherein
    the first controller guides a first payload and a second payload generated from the transmission signal to the first encoder and the second encoder, respectively;
    the first encoder adds a first error correction code to the first payload;
    the second encoder adds a second error correction code to the second payload, a number of bits of the second error correction code being smaller than a number of bits of the first correction code;
    the error correction code encoder converts the first error correction code added to the first payload into a third error correction code by puncturing, a number of the bits of the third error correction code being smaller than the number of bits of the first error correction code;
    the error correction code decoder converts the third correction code added to the first payload into a fourth error correction code using a dummy bit, a number of the fourth error correction code being equal to the number of bits of the first error correction code;
    the first decoder performs error correction of the first payload using the fourth error correction code; and
    the second decoder performs error correction of the second payload using the second error correction code.

4. The optical transmission system according to claim 2, wherein
    the first communication device further includes a mapper configured to perform mapping of an output signal of the error correction code encoder to a symbol according to a specified modulation scheme; and
    the mapper performs mapping of the output signal of the error correction code encoder to a symbol so that a power for transmitting an output signal of the second encoder becomes higher than a power for transmitting an output signal of the first encoder.

5. The optical transmission system according to claim 4, wherein
    the first communication device further includes:
        a first storing unit configured to store data for mapping the output signal of the first encoder to a symbol; and a second storing unit configured to store data for mapping the output signal of the second encoder to a symbol, wherein the mapper performs mapping of the output signal of the first encoder according to the data stored in the first storing unit when the output signal of the first encoder is given, and performs mapping of the output signal of the second encoder according to the data stored in the second storing unit when the output signal of the second encoder is given.

6. The optical transmission system according to claim 2, wherein the first communication device further includes a mapper configured to perform mapping of an output signal of the error correction code encoder to a symbol according to a specified modulation scheme;

the first controller guides a first payload and a second payload generated from the transmission signal to the first encoder and the second encoder, respectively;

the first encoder adds a first error correction code to the first payload;

the second encoder adds a second error correction code to the second payload, a number of bits of the second error correction code being smaller than a number of bits of the first correction code; and the mapper performs mapping of a portion of an output signal of the first encoder to a symbol in a first modulation scheme, performs mapping of remaining portion of the output signal of the first encoder to a symbol in a second modulation scheme, and performs mapping of an output signal of the second encoder to a symbol in the first modulation scheme, the number of bits per symbol in the second modulation scheme being larger than the number of bits per symbol in the first modulation scheme.

7. The optical transmission system according to claim 2, wherein the first communication device further includes a transmission signal processor configured to transmit an output signal of the error correction code encoder to the second communication device;

the first controller guides a first payload and a second payload generated from the transmission signal to the first encoder and the second encoder, respectively;

the first encoder adds a first error correction code to the first payload;

the second encoder adds a second error correction code to the second payload, a number of bits of the second error correction code being smaller than a number of bits of the first correction code; and the transmission signal processor transmits an output signal of the error correction code encoder to the second communication device so that a symbol rate for transmitting an output signal of the first encoder becomes higher than a symbol rate for transmitting an output signal of the second encoder.

8. The optical transmission system according to claim 2, wherein the first communication device further includes a mapper configured to perform mapping of an output signal of the error correction code encoder to a symbol according to a specified modulation scheme; and the mapper performs mapping of the output signal of the error correction code encoder so that bits extracted from an output signal of the second encoder specify an area on a constellation plane, and bits extracted from an output signal of the first encoder specify a signal point in the specified area.

9. The optical transmission system according to claim 2, wherein the first communication device further includes a transmission signal processor configured to transmit an output signal of the error correction code encoder to the second communication device using a plurality of subcarriers of different frequencies; and the transmission signal processor allocates an output signal of the first encoder to a subcarrier whose quality is low among the plurality of subcarriers, and allocates an output signal of the second encoder to a subcarrier whose quality is high among the plurality of subcarriers.

10. The optical transmission system according to claim 4, wherein the first communication device further includes a transmission signal processor configured to transmit an output signal of the error correction code encoder to the second communication device; and the transmission signal processor alternatingly transmits one symbol to which an output signal of the first encoder is mapped and one symbol to which an output signal of the second encoder is mapped to the second communication device.

* * * * *